United States Patent
Kundu et al.

(10) Patent No.: US 11,743,887 B2
(45) Date of Patent: Aug. 29, 2023

(54) RESOURCE ALLOCATION FOR PHYSICAL UPLINK CONTROL CHANNEL DURING INITIAL ACCESS IN NEW RADIO UNLICENSED

(71) Applicant: Intel Corporation, Santa Clara, CA (US)

(72) Inventors: Lopamudra Kundu, Sunnyvale, CA (US); Gang Xiong, Portland, OR (US); Yongjun Kwak, San Diego, CA (US); Yingyang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 17/070,791

(22) Filed: Oct. 14, 2020

(65) Prior Publication Data

US 2021/0029731 A1   Jan. 28, 2021

Related U.S. Application Data

(60) Provisional application No. 62/915,408, filed on Oct. 15, 2019, provisional application No. 62/937,113, filed on Nov. 18, 2019.

(51) Int. Cl.
| | |
|---|---|
| *H04W 72/12* | (2023.01) |
| *H04W 16/14* | (2009.01) |
| *H04W 72/02* | (2009.01) |
| *H04L 1/18* | (2023.01) |
| *H04W 72/1268* | (2023.01) |
| *H04L 1/1812* | (2023.01) |

(52) U.S. Cl.
CPC ....... *H04W 72/1268* (2013.01); *H04L 1/1812* (2013.01); *H04W 16/14* (2013.01); *H04W 72/02* (2013.01)

(58) Field of Classification Search
CPC ................. H04W 28/04; H04W 72/04; H04W 72/042; H04W 88/08; H04W 72/1268; H04W 72/02; H04W 16/14; H04L 5/0007; H04L 1/1812
USPC ......................................................... 370/329
See application file for complete search history.

(56) References Cited

U.S. PATENT DOCUMENTS

| | | | |
|---|---|---|---|
| 2014/0177580 A1* | 6/2014 | Takaoka ................ | H04L 5/0005 370/329 |
| 2019/0253976 A1* | 8/2019 | Pelletier .............. | H04W 52/146 |
| 2019/0349178 A1* | 11/2019 | Jia ........................ | H04W 72/042 |

(Continued)

FOREIGN PATENT DOCUMENTS

| | | | | |
|---|---|---|---|---|
| WO | WO 2020/028868 A1 * | 2/2020 | ............... | H04L 5/00 |
| WO | WO 2020/146643 A1 * | 7/2020 | ............... | H04L 5/00 |
| WO | WO 2020/191405 A1 * | 9/2020 | ............ | H04W 74/08 |

(Continued)

*Primary Examiner* — Peter G Solinsky
*Assistant Examiner* — Sanjay K Dewan
(74) *Attorney, Agent, or Firm* — Schwabe, Williamson & Wyatt, P.C.

(57) ABSTRACT

Disclosed embodiments are related to resource allocation to 3GPP New Radio (NR) physical uplink control channel (PUCCH) in unlicensed spectrum. Embodiments include enhancements of NR PUCCH resource sets before dedicated PUCCH configuration via Radio Resource Control (RRC) signaling to enable PUCCH configuration during initial access in NR-unlicensed. Other embodiments may be described and/or claimed.

20 Claims, 12 Drawing Sheets

(56) References Cited

U.S. PATENT DOCUMENTS

2022/0141864 A1\* 5/2022 Karaki ................. H04W 72/14
370/329

FOREIGN PATENT DOCUMENTS

| WO | WO 2021/001770 A1 \* | 1/2021 | ............... H04L 5/00 |
| WO | WO 2021/067391 A1 \* | 4/2021 | ............ H04W 28/00 |

\* cited by examiner

RESOURCE ALLOCATION FOR PHYSICAL UPLINK CONTROL CHANNEL DURING INITIAL ACCESS IN NEW RADIO UNLICENSED

CROSS REFERENCE TO RELATED APPLICATION

The present application claims priority to U.S. Provisional App. No. 62/915,408 filed Oct. 15, 2019 and U.S. Provisional App. No. 62/937,113 filed Nov. 18, 2019, the contents of each of which are hereby incorporated by reference in their entireties.

FIELD

Embodiments relate generally to the technical field of wireless communications, communication networks, and information security (InfoSec), and in particular to preventing man-in-the-middle attacks during network attachment and/or network re-establishment procedures.

BACKGROUND

One major enhancement for Third Generation Partnership Project (3GPP) Long Term Evolution (LTE) release (Rel)-13 (or LTE-Advanced Pro ("LTE-A Pro")) has been to enable the operation of cellular networks in the unlicensed spectrum via Licensed Assisted Access (LAA). LTE in unlicensed spectrum ("LTE-Unlicensed" or "LTE-U") is an extension of LTE that allows cellular network operators to offload some of their data traffic by accessing the unlicensed 5 GHz frequency band used by IEEE 802.11 (WiFi) networks. LAA is the second variant of LTE-U, which enables cellular network operators to offer higher speeds to end-users through the aggregation of unlicensed spectrum with licensed spectrum. LAA also adheres to requirements of the listen-before-talk (LBT) protocol.

Ever since, exploiting the access of unlicensed spectrum is considered by 3GPP as one of the promising solutions to cope with the increasing growth of wireless data traffic. Following the trend of LTE enhancements, a study on 3GPP New Radio (NR) based access to unlicensed spectrum (referred to as "NR-unlicensed" or "NR-U") started in 3GPP Rel-15. Within the scope of this study, one of the primary objectives is to identify additional functionalities that are needed for PHY layer design of NR to operate in unlicensed spectrum. In particular, it is desirable to minimize the design efforts by identifying the essential enhancements needed for Rel-15 NR design to enable unlicensed operation, while avoiding unnecessary divergence from Rel-15 NR licensed framework. Coexistence methods already defined for LTE-based LAA context should be assumed as the baseline for the operation of NR-unlicensed systems, while enhancements over these existing methods are not precluded. NR-based operation in unlicensed spectrum should not impact deployed Wi-Fi services (e.g., data, video and voice services) more than an additional Wi-Fi network on the same carrier.

Regulatory requirements must be mandatorily met by networks and systems operating in unlicensed spectrum. One of such regulatory restrictions imposed on physical channels/signals operating in unlicensed spectrum is related to the bandwidth occupied by these channels/signals, referred to as Occupied Channel Bandwidth (OCB). According to ETSI harmonised standard for 5 GHz, limits on OCB are stated as follows: "The Occupied Channel Bandwidth shall be between 80% and 100% of the Nominal Channel Bandwidth. In case of smart antenna systems (devices with multiple transmit chains) each of the transmit chains shall meet this requirement. The Occupied Channel Bandwidth might change with time/payload. During a Channel Occupancy Time (COT), equipment may operate temporarily with an Occupied Channel Bandwidth of less than 80% of its Nominal Channel Bandwidth with a minimum of 2 MHz."

In addition to restrictions on OCB, there are important regulatory rules on power usage by networks and systems operating in unlicensed spectrum, as follows: (A) Regulations on the maximum power spectral density are typically stated with a resolution bandwidth of 1 MHz. The ETSI specification requires a maximum Power Spectral Density (PSD) of 10 dBm/MHz for 5150-5350 MHz, while Federal Communications Commission (FCC) has a maximum PSD of 11 dBm/MHz for 5150-5350 MHz. Additionally, regulations require 10 KHz resolution for testing the 1 MHz PSD constraint and, thus, the maximum PSD constraint should be met in any occupied 1 MHz bandwidth. (B) In addition, the regulations impose a band specific total maximum transmission power in terms of EIRP, e.g., ETSI has EIRP limit of 23 dBm for 5150-5350 MHz.

The regulatory limitations imposed in terms of OCB and PSD guided the design choices for the uplink channels of legacy LTE-unlicensed system and it will not be any different for NR-unlicensed system as well. Legacy LTE-unlicensed system or Rel-14 eLAA was designed to meet the aforementioned regulations while utilizing the available spectrum efficiently. But the enhancement of LTE-unlicensed design to NR-unlicensed will not be straightforward, since NR is targeted to support diverse numerology configurations with much wider channel bandwidth than LTE's 20 MHz. On the other hand, though it is desirable to avoid unnecessary divergence from Rel-15 NR framework as much as possible while designing uplink physical signals/channels for NR-unlicensed spectrum, the regulatory constraints will necessitate redesign of NR physical signals/channels to certain extents in order to meet the essential requirements of unlicensed spectrum usage

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
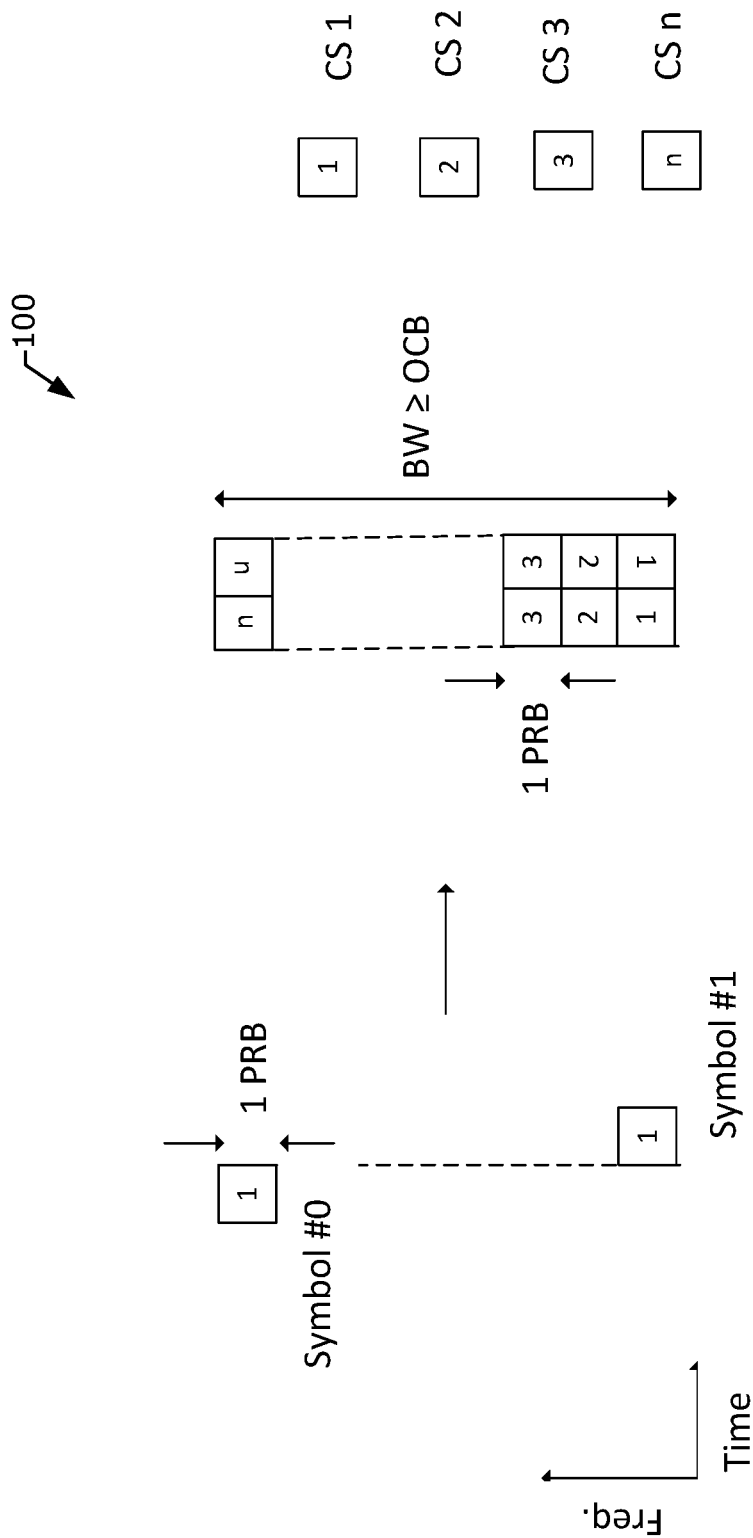
FIGS. 1, 2, 3, and 4 illustrate various example enhancements various PUCCH formats according to various embodiments.

In the above context, the present disclosure discusses potential enhancements of resource allocation to NR PUCCH during initial access, for example, before RRC connection setup to meet the regulatory requirements in unlicensed spectrum.

Currently, the baseline PUCCH resource configuration before RRC connection setup is based on two different PUCCH formats, viz. PUCCH format 0 and PUCCH format 1 in NR licensed spectrum. The primary purpose of this PUCCH resource configuration is to enable transmission of 1-bit hybrid automatic repeat request-acknowledgement (HARQ-ACK) over PUCCH in response to message 4 during initial access. However, legacy NR-licensed PUCCH resource configuration before RRC connection setup using formats 0 and 1 is not suitable for NR-unlicensed spectrum, since unlicensed spectrum utilization is restricted by regulatory limitations, especially in terms of OCB, which cannot be fulfilled by existing single PRB NR-PUCCH formats 0 and 1 designed for licensed spectrum.

The present disclosure provides embodiments that enhance NR PUCCH resource sets before dedicated PUCCH configuration via RRC signaling to enable PUCCH configuration during initial access in NR-unlicensed (NR-U). The present disclosure also provides embodiments related to PUCCH resource configuration for NR-U. The enhanced NR PUCCH resource configuration before RRC connection setup enables HARQ-ACK feedback over PUCCH in response to message 4 during initial access over unlicensed spectrum. Additionally, the present disclosure provides and/or defines parameters required to configure PUCCH resource for the transmission of uplink control information (UCI) over PUCCH in response to message 4 during initial access using unlicensed spectrum.

1. UCI Reporting in Physical Uplink Control Channel

UCI types reported in a Physical Uplink Control Channel (PUCCH) include HARQ-ACK information, scheduling request (SR), link recovery request (LRR), and/or channel state information (CSI). UCI bits include HARQ-ACK information bits, if any, SR information bits, if any, LRR information bit(s), if any, and/or CSI bits, if any. The HARQ-ACK information bits correspond to a HARQ-ACK codebook as described in Clause 9.1 of 3GPP TS 38.213 v15.7.0 (2019 Sep. 28) ("[TS38213]"). For purposes of the present disclosure, any reference to SR is also applicable for SR and/or for LRR.

A UE (e.g., UE 502 in FIG. 5) may transmit one or two PUCCHs on a serving cell in different symbols within a slot. When the UE transmits two PUCCHs in a slot and the UE is not provided ackNackFeedbackMode-r16=separate, at least one of the two PUCCHs uses PUCCH format 0 or PUCCH format 2.

Additionally or alternatively, a UE 502 may transmit one or two PUCCHs on a serving cell in different symbols within a slot of $N_{symb}^{slot}$ symbols. When the UE transmits two PUCCHs in a slot, at least one of the two PUCCHs uses PUCCH format 0 or PUCCH format 2.

If the UE 502 is provided ackNackFeedbackMode-r16=separate, the UE may transmit up to two PUCCHs with HARQ-ACK information in different symbols within a slot.

As described in clauses 9.2.3, 9.2.5.1 and 9.2.5.2 of [TS38213], the UE 502 assumes 11 cyclic redundancy check (CRC) bits if a number of respective UCI bits is larger than or equal to 360; otherwise, the UE 502 determines a number of CRC bits based on the number of respective UCI bits as described in 3GPP TS 38.212 v15.7.0 (2019 Sep. 28) ("[TS38212]").

If the UE 502 receives a Physical Downlink Shared Channel (PDSCH) without receiving a corresponding Physical Downlink Control Channel (PDCCH), or if the UE receives a PDCCH indicating a semi-persistent scheduling (SPS) PDSCH release, the UE generates one corresponding HARQ-ACK information bit. If the UE is not provided higher layer parameter PDSCH-CodeBlockGroupTransmission, the UE generates one HARQ-ACK information bit per transport block. A UE does not expect to be indicated to transmit HARQ-ACK information for more than two SPS PDSCH receptions in a same PUCCH.

Additionally, the CRC for a DCI format is scrambled with a Radio Network Temporary Identifier (RNTI) such as Cell RNTI (C-RNTI), a modulation and coding scheme (MCS) C-RNTI (MCS-C-RNTI), or a Configured Scheduling RNTI (CS-RNTI). For example, the CRC for DCI format 1_0 is scrambled with a C-RNTI, an MCS-C-RNTI, or a CS-RNTI, and the CRC for DCI format 1_1 is scrambled with a C-RNTI or an MCS-C-RNTI.

2. PUCCH Resource Sets

The baseline structure of PUCCH resource sets before dedicated PUCCH resource configuration include the following aspects.

If a UE 502 (see e.g., FIG. 5) does not have dedicated PUCCH resource configuration, provided by PUCCH-ResourceSet in PUCCH-Config, a PUCCH resource set is provided by pucch-ResourceCommon through an index to a row of Table 1 for transmission of HARQ-ACK information on PUCCH in an initial UL BWP of $N_{BWP}^{size}$ Physical Resource Blocks (PRBs).

Additionally or alternatively, if a UE 502 does not have dedicated PUCCH resource configuration, provided by higher layer parameter PUCCH-ResourceSet in PUCCH-Config, a PUCCH resource set is provided by higher layer parameter pucch-ResourceCommon in SystemInformationBlockType1 through an index to a row of Table 1 for transmission of HARQ-ACK information on PUCCH in an initial active UL BWP of $N_{BWP}^{size}$ PRBs provided by SystemInformationBlockType1.

The PUCCH resource set includes sixteen resources, each corresponding to a PUCCH format, a first symbol, a duration, a PRB offset $RB_{BWP}^{offset}$, and a cyclic shift index set for a PUCCH transmission.

The supported PUCCH durations and starting symbols, which may always be aligned with slot boundary, include symbol duration 2/4/10/14→starting symbol index #12/#10/#4/#0. The supported PUCCH formats include PUCCH format 0 and PUCCH format 1 (e.g., for a single PRB). The supported PUCCH payload size is only 1-bit, which may be a HARQ-ACK in response to message 4 during initial access.

The UE 502 transmits a PUCCH using frequency hopping if not provided useInterlacePUCCH-PUSCH in BWP-UplinkCommon; otherwise, the UE transmits a PUCCH without frequency hopping.

An orthogonal cover code with index 0 is used for a PUCCH resource with PUCCH format 1 in Table 1. The index to a row of Table 1 may be a 4-bit remaining minimum system information (RMSI) index, and each row in the table configures a set of 16 cell-specific PUCCH resources. As shown by Table 1, a PUCCH resource includes or is indicated by 5 parameters: a PUCCH format, a starting symbol, a duration, a PRB offset $RB_{BWP}^{offset}$, and a set of initial cyclic shift (CS) indices (or a CS index set for a PUCCH transmission).

In some embodiments, the UE 502 transmits the PUCCH using the same spatial domain transmission filter as for the Msg3 PUSCH transmission. Additionally or alternatively, the UE 502 transmits the PUCCH using the same spatial domain transmission filter as for a PUSCH transmission scheduled by a RAR UL grant as described in Clause 8.3 of [TS38213]. If the UE 502 is not provided pdsch-HARQ-ACK-Codebook, the UE 502 generates at most one HARQ-ACK information bit.

If the UE 502 provides HARQ-ACK information in a PUCCH transmission in response to detecting a DCI format (e.g., DCI format 1_0 or DCI format 11), the UE 502 determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI}$$

where $N_{CCE}$ Sa number of CCEs in a control resource set (CORESET) of a PDCCH reception with the DCI format (e.g., DCI format 1_0 or DCI format 11), as described in Subclause 10.1 of [TS38213]; $n_{CCE,0}$ is the index of a first Control Channel Element (CCE) for the PDCCH reception, and/or $n_{CCE,0}$ is a starting CCE index for the detected PDCCH in CORESET 0; and $\Delta_{PRI}$ is a value of the PUCCH resource indicator field in the DCI format (e.g., DCI format 1_0 or DCI format 1_1, which may be 3 bits). The 3 bit PUCCH resource indicator in the DCI format (e.g., DCI format 1_0 or DCI format 1_1) and starting CCE index (for 1-bit) is used to derive PUCCH resource index $r_{PUCCH}$ ($0 \leq r_{PUCCH} \leq 15$) according to the aforementioned equation(s). The DCI format may be used for scheduling a PDSCH reception or an SPS PDSCH release.

additionally or alternatively, if the UE 502 provides HARQ-ACK information in a PUCCH transmission in response to detecting a DCI format the UE 502 determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE,0}} \right\rfloor + 2 \cdot \Delta_{PRI},$$

wherein $N_{CCE,0}$ is a total number of CCEs in CORESET 0 for PDCCH monitoring; and $n_{CCE,0}$ and $\Delta_{PRI}$ are the same as discussed previously.

In some embodiments, PRB indices, hopping direction and initial CS index are determined from PUCCH resource index $r_{PUCCH}$. PRB indices (in $1^{st}$ and $2^{nd}$ frequency hops) are functions of PRB offset ($RB_{BWP}^{offset}$), total number of cyclic shift indices in the cyclic shift index set ($N_{CS}$) and PUCCH resource index $r_{PUCCH}$. Initial cyclic shift index in the set of initial cyclic shift indexes is a function of $r_{PUCCH}$ and $N_{CS}$.

If $\lfloor r_{PUCCH}/8 \rfloor=0$, the UE 502 determines the PRB index of the PUCCH transmission in the first hop as $RB_{BWP}^{offset}+\lfloor r_{PUCCH}/N_{CS} \rfloor$. and the PRB index of the PUCCH transmission in the second hop as $N_{BWP}^{size}-1-RB_{BWP}^{offset}-\lfloor r_{PUCCH}/N_{CS} \rfloor$, where $N_{CS}$ is the total number of initial cyclic shift indexes in the set of initial cyclic shift indexes, and the UE 502 determines the initial cyclic shift index in the set of initial cyclic shift indexes as $r_{PUCCH}$ mod $N_{CS}$.

Additionally or alternatively, if $\lfloor r_{PUCCH}/8 \rfloor=0$ and the UE 502 is provided a PUCCH resource by pucch-ResourceCommon and is not provided useInterlacePUCCH-PUSCH-r16 in BWP-UplinkCommon, the UE 502 determines the PRB index of the PUCCH transmission in the first hop as $RB_{BWP}^{offset}+\lfloor r_{PUCCH}/N_{CS} \rfloor$ and the PRB index of the PUCCH transmission in the second hop as $N_{BWP}^{offset}-1-RB_{BWP}^{offset}-\lfloor r_{PUCCH}/N_{CS} \rfloor$, where $N_{CS}$ is the total number of initial cyclic shift indexes in the set of initial cyclic shift indexes, and the UE 502 determines the initial cyclic shift index in the set of initial cyclic shift indexes as $r_{PUCCH}$ mod $N_{CS}$.

If $\lfloor r_{PUCCH}/8 \rfloor=1$, the UE 502 determines the PRB index of the PUCCH transmission in the first hop as $N_{BWP}^{size}-1-RB_{BWP}^{offset}-\lfloor (r_{PUCCH}-8)/N_{CS} \rfloor$ and the PRB index of the PUCCH transmission in the second hop as $RB_{BWP}^{offset}+\lfloor (r_{PUCCH}-8)/N_{CS} \rfloor$, and the UE 502 determines the initial cyclic shift index in the set of initial cyclic shift indexes as $(r_{PUCCH}-8)$ mod $N_{CS}$.

Additionally or alternatively, if $\lfloor r_{PUCCH}/8 \rfloor=1$ and the UE 502 is provided a PUCCH resource by pucch-ResourceCommon and is not provided useInterlacePUCCH-PUSCH in BWP-UplinkCommon, the UE 502 determines the PRB index of the PUCCH transmission in the first hop as $N_{BWP}^{size}-1-RB_{BWP}^{offset}\lfloor (r_{PUCCH}-8)/N_{CS} \rfloor$ and the PRB index of the PUCCH transmission in the second hop as $RB_{BWP}^{offset}+\lfloor (r_{PUCCH}-8)/N_{CS} \rfloor$, and the UE 502 determines the initial cyclic shift index in the set of initial cyclic shift indexes as $(r_{PUCCH}-8)$mod $N_{CS}$.

If the UE 502 is provided a PUCCH resource by pucch-ResourceCommon and is provided useInterlacePUCCH-PUSCH in BWP-UplinkCommon, then:

The UE 502 determines for the PUCCH resource an interlace index m as $m=(m_0+\lfloor r_{PUCCH}/N_{CS} \rfloor)$mod M where M is a number of interlaces (see e.g., 3GPP TS 38.211 v15.7.0 (2019 Sep. 28) ("[TS38211]") and $m_0=RB_{BWP}^{offset}$ is an interlace index offset and $RB_{BWP}^{offset}$ is as given in Table 1;

The UE 502 determines an initial cyclic shift index in a set of initial cyclic shift indexes as $r_{PUCCH}$ mod $N_{CS}$, where $N_{CS}$ is the total number of initial cyclic shifts indexes in the set of initial cyclic shift indexes in Table 1, and if pucch-ResourceCommon indicates: index 0: the first symbol is 9 for a PUCCH resource with PUCCH format 0 if $r_{PUCCH} \geq 10$; index 1 or 2: the first symbol is 9 for a PUCCH resource with PUCCH format 0 if $r_{PUCCH}=15$; and/or index 3, 7, or 11: an orthogonal cover code with index 1 is used for a PUCCH resource with PUCCH format 1 if $r_{PUCCH} \geq 10$; and The UE 502 does not expectpucch-ResourceCommon to indicate index 15.

In an example where a corresponding to index 0 in Table 1, $RB_{BWP}^{offset}=0$ and set of initial CS indices={0, 3}, then for $0 \leq r_{PUCCH} \leq 15$, PRB indices in the $1^{st}$ and $2^{nd}$ hops and initial CS index are:

PRB indices in the $1^{st}$ hop={0,0,1,1,2,2,3,3, [$N_{BWP}^{size}-1-\{0,0,1,1,2,2,3,3\}$]}

PRB indices in the $2^{nd}$ hop={[$N_{BWP}-1-\{0,0,1,1,2,2,3,3\}$],0,0,1,1,2,2,3,3}

Initial CS index in the set of CS indices={0,1,0,1,0,1,0,1,0,1,0,1,0,1,0,1}→CS index from the last column and first row of Table 1={0,3,0,3,0,3,0,3,0,3,0,3,0,3,0,3}

Examples with different values of $r_{PUCCH}$, then for $r_{PUCCH}=3 \to \{$PRB index 1st hop, PRB index 2nd hop, initial CS$\}=\{1,(N_{BWP}-1-1), 3\}$, and for $r_{PUCCH}=12 \to \{$PRB index 1st hop, PRB index 2nd hop, initial CS$\}=\{(N_{BWP}^{size}-1-2), 2, 0\}$.

If the UE 502 has dedicated PUCCH resource configuration, the UE 502 is provided by higher layers with one or more PUCCH resources.

In some embodiments, a PUCCH resource includes the following parameters: a PUCCH resource index provided by higher layer parameter pucch-ResourceId; an index of the first PRB prior to frequency hopping or for no frequency hopping by higher layer parameter startingPRB; an index of the first PRB after frequency hopping by higher layer parameter secondHopPRB; an indication for intra-slot frequency hopping by higher layer parameter intraSlotFrequencyHopping; and a configuration for a PUCCH format, from PUCCH format 0 through PUCCH format 4, provided by higher layer parameter format.

In some embodiments, a PUCCH resource includes the following parameters: a PUCCH resource index provided by pucch-ResourceId; an index of the first PRB prior to frequency hopping or for no frequency hopping by startingPRB, if a UE is not provided useInterlacePUCCH-PUSCH in BWP-UplinkDedicated; an index of the first PRB after frequency hopping by secondHopPRB, if the UE 502 is not provided useInterlacePUCCH-PUSCH in BWP-UplinkDedicated; an indication for intra-slot frequency hopping by intraSlotFrequencyHopping, if the UE 502 is not provided useInterlacePUCCH-PUSCH in BWP-UplinkDedicated; an index of a first interlace by interlace0, if a UE is provided useInterlacePUCCH-PUSCH in BWP-UplinkDedicated; if provided, an index of a second interlace by interlace1, if the UE 502 is provided useInterlacePUCCH-PUSCH in BWP-UplinkDedicated; an index of an RB set by rb-SetIndex, if the UE 502 is provided useInterlacePUCCH-PUSCH in BWP-UplinkDedicated; and a configuration for a PUCCH format provided by format.

The UE 502 expects that useInterlacePUCCH-PUSCH in BWP-UplinkCommon and useInterlacePUCCH-PUSCH in BWP-UplinkDedicated are provided either in all UL BWPs or in none of the UL BWPs for a serving cell.

If the UE 502 is provided useInterlacePUCCH-PUSCH in BWP-UplinkDedicated, the UE 502 determines available RBs for PUCCH transmissions within the active UL BWP as the intersection of RBs corresponding to an interlace index provided by interlace0 and, if provided, interlace1, and RBs of an RB set provided by rb-SetIndex. The intersection results in $M_{interlace,0}^{PUCCH}$ RBs in the first interlace and the UE 502 expects that $M_{interlace,0}^{PUCCH}$ is either 10 or 11. If interlace1 is provided, the intersection results in $M_{interlace,1}^{PUCCH}$ RBs in the second interlace and the UE 502 expects that $M_{interlace,1}^{PUCCH}$ is either 10 or 11.

If the higher layer parameter format indicates PUCCH-format0, the PUCCH format configured for a PUCCH resource is PUCCH format 0, where the PUCCH resource also includes an index for an initial cyclic shift provided by higher layer parameter initialCyclicShift, a number of symbols for a PUCCH transmission provided by higher layer parameter nrofSymbols, a first symbol for the PUCCH transmission provided by higher layer parameter startingSymbolIndex.

If the higher layer parameter format indicates PUCCH-format1, the PUCCH format configured for a PUCCH resource is PUCCH format 1, where the PUCCH resource also includes an index for an initial cyclic shift provided by higher layer parameter initialCyclicShift, a number of symbols for a PUCCH transmission provided by higher layer parameter nrofSymbols, a first symbol for the PUCCH transmission provided by higher layer parameter startingSymbolIndex, and an index for an orthogonal cover code by higher layer parameter timeDomainOCC.

If the higher layer parameter format indicates PUCCH-format2 or PUCCH-format3, the PUCCH format configured for a PUCCH resource is PUCCH format 2 or PUCCH format 3, respectively, where the PUCCH resource also includes a number of PRBs provided by higher layer parameter nrofPRBs, a number of symbols for a PUCCH transmission provided by higher layer parameter nrofSymbols, and a first symbol for the PUCCH transmission provided by higher layer parameter startingSymbolIndex.

If the format indicates PUCCH-format2 or PUCCH-format3, the PUCCH format configured for a PUCCH resource is PUCCH format 2 or PUCCH format 3, respectively, where the PUCCH resource also includes a number of PRBs provided by nrofPRBs, a number of symbols for a PUCCH transmission provided by nrofSymbols, and a first symbol for the PUCCH transmission provided by startingSymbolIndex. If a UE is provided by useInterlacePUCCH-PUSCH in BWP-UplinkDedicated, and the format indicates PUCCH-format2-r16 or PUCCH-format3-r16, the PUCCH resource also includes, if provided, an index of a second interlace by interlace1. If format indicates PUCCH-format2-r16 or PUCCH-format3-r16 and interlace1 is not provided, the PUCCH resource also includes, if provided, an orthogonal cover code length by OCC-Length-r16 and an orthogonal cover code index by OCC-Index-r16. If the format indicates PUCCH-format3-r16, the UE assumes that the $M_{RB}^{PUCCH,3}$ (see e.g., [TS38211]) PRBs with the lowest indexes within the first, and if configured, second interlace are used for PUCCH transmission.

If the higher layer parameter format indicates PUCCH-format4, the PUCCH format configured for a PUCCH resource is PUCCH format 4, where the PUCCH resource also includes a number of symbols for a PUCCH transmission provided by higher layer parameter nrofSymbols, a length for an orthogonal cover code by higher layer parameter occ-Length, an index for an orthogonal cover code by higher layer parameter occ-Index, and a first symbol for the PUCCH transmission provided by higher layer parameter startingSymbolIndex.

If a UE is provided subslotLengthForPUCCH-r16 in a PUCCH-Config, the first symbol of a PUCCH resource in PUCCH-Config for multiplexing HARQ-ACK in a PUCCH transmission is relative to the first symbol of the subsotLengthForPUCCH-r16 symbols (see e.g., 3GPP TS 38.331 v15.7.0 (2019 Sep. 27) ("[TS38311]"). For the remaining cases, the first symbol of a PUCCH resource is relative to the first symbol of a slot with $N_{sym}^{slot}$ symbols (see e.g., [TS38211]).

TABLE 1

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |

TABLE 1-continued

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The UE 502 can be configured up to four sets of PUCCH resources. A PUCCH resource set is provided by higher layer parameter PUCCH-ResourceSet and is associated with a PUCCH resource set index provided by higher layer parameter pucch-ResourceSetId, with a set of PUCCH resource indexes provided by higher layer parameter resourceList that provides a set of pucch-ResourceId used in the PUCCH resource set, and with a maximum number of UCI information bits the UE 502 can transmit using a PUCCH resource in the PUCCH resource set provided by higher layer parameter maxPayloadMinus. For the first PUCCH resource set, the maximum number of UCI information bits is 2. A maximum number of PUCCH resource indexes for a set of PUCCH resources is provided by higher layer parameter maxNrofPUCCH-ResourcesPerSet. The maximum number of PUCCH resources in the first PUCCH resource set is 32 and the maximum number of PUCCH resources in the other PUCCH resource sets is 8.

Additionally or alternatively, a PUCCH resource set is provided by PUCCH-ResourceSet and is associated with a PUCCH resource set index provided by pucch-ResourceSetId, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadSize. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32 and the maximum number of PUCCH resources in the other PUCCH resource sets is 8.

If the UE 502 transmits $N_{uc}$ UCI information bits, that include HARQ-ACK information bits, the UE 502 determines a PUCCH resource set to be:

a first set of PUCCH resources with pucch-ResourceSetId=0 if $N_{UCI} \leq 2$ including 1 or 2 HARQ-ACK information bits and a positive or negative SR on one SR transmission occasion if transmission of HARQ-ACK information and SR occurs simultaneously;

a second set of PUCCH resources with pucch-ResourceSetId=1, if provided by higher layers, if $2 < N_{UCI} \leq N_2$ where $N_2$ is provided by higher layer parameter maxPayloadMinus1 for the PUCCH resource set with pucch-ResourceSetId=1;

a third set of PUCCH resources with pucch-ResourceSetId=2, if provided by higher layers, if $N_2 < N_{UCI} \leq N_3$ where $N_3$ is provided by higher layer parameter maxPayloadMinus1 for the PUCCH resource set with pucch-ResourceSetId=2; or a fourth set of PUCCH resources with pucch-ResourceSetId=3, if provided by higher layers, if $N_3 < N_{UCI} \leq 1706$.

If the UE 502 transmits $O_{UCI}$ UCI information bits, that include HARQ-ACK information bits, the UE 502 determines a PUCCH resource set to be:

a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously;

a second set of PUCCH resources with pucch-ResourceSetId=1, if provided by higher layers, if $2 < O_{UCI} \leq N_2$ where $N_2$ is equal to maxPayloadSize if maxPayloadSize is provided for the PUCCH resource set with pucch-ResourceSetId=1; otherwise $N_2$ is equal to 1706;

a third set of PUCCH resources with pucch-ResourceSetId=2, if provided by higher layers, if $N_2 < O_{UCI} \leq N_3$ where $N_3$ is equal to maxPayloadSize if maxPayloadSize is provided for the PUCCH resource set with pucch-ResourceSetId=2; otherwise $N_3$ is equal to 1706; or a fourth set of PUCCH resources with pucch-ResourceSetId=3, if provided by higher layers, if $N_3 < O_{UCI} \leq 1706$.

If the UE 502 is provided SPS-PUCCH-AN-List-r16 and transmits $O_{UCI}$ UCI information bits that include only HARQ-ACK information bits in response to one or more SPS PDSCH receptions, the UE 502 determines a PUCCH resource to be:

a PUCCH resource provided by sps-PUCCH-AN-ResourceID obtained from the first entry in sps-PUCCH-AN-List-r16 if $O_{UCI} \leq 2$;

a PUCCH resource provided by sps-PUCCH-AN-ResourceID obtained from the second entry in sps-PUCCH-AN-List-r16, if provided, if $2 < O_{UCI} \leq N_{1,SPS}$ where $N_{1,SPS}$ is either provided by maxPayloadSize obtained from the second entry in sps-PUCCH-AN-List-r16 or is otherwise equal to 1706;

a PUCCH resource provided by sps-PUCCH-AN-ResourceID obtained from the third entry in sps-PUCCH-AN-List-r16, if provided, if $N_{1,SPS} < O_{UCI} \leq N_{2,SPS}$ where $N_{2,SPS}$ is either provided by maxPayloadSize obtained from the third entry in sps-PUCCH-AN-List-r16 or is otherwise equal to 1706; or a PUCCH resource provided by sps-PUCCH-AN-ResourceID obtained from the fourth entry in sps-PUCCH-AN-List-r16, if provided, if $N_{2,SPS} < O_{UCI} \leq N_{3,SPS}$ where $N_{3,SPS}$ is equal to 1706.

3. Enhancements to PUCCH Resource Sets Before Dedicated PUCCH Resource Configuration In NR-unlicensed, transmission of all signals/channels must abide by the regulatory requirements related to OCB, which is a minimum of 2 MHz. Since a single PRB transmission in FR1 cannot meet this requirement, PUCCH resource sets are to be enhanced to support multi-PRB transmission in order to fulfil OCB related regulatory criteria. The enhancements from single PRB to multi-PRB transmission can be categorized as follows: (1) Contiguous PRB allocation, and (2) Non-contiguous PRB allocation (e.g., interlace based). Enhancements related to each of these frequency allocation schemes are detailed below.

3.1. Embodiment 1: Enhancements to PUCCH Resource Sets Configuration During Initial Access with Contiguous PRB Allocation

3.1.1. Embodiment 1-1: Using PUCCH Formats 0 and 1

In embodiments, PUCCH resource set before RRC connection set up can be configured using existing PUCCH formats used in NR-licensed operation, e.g., PUCCH formats 0 and 1 which are inherently single-PRB (each PRB consisting of 12 sub-carriers) PUCCH formats. Both these single-PRB PUCCH formats can be enhanced to multiple PRBs (e.g., n PRBs) so that OCB requirement is met. Further, these n PRBs can be allocated contiguously in frequency, where: n≥[{OCB/(12*SCS)}].

Figure 2:
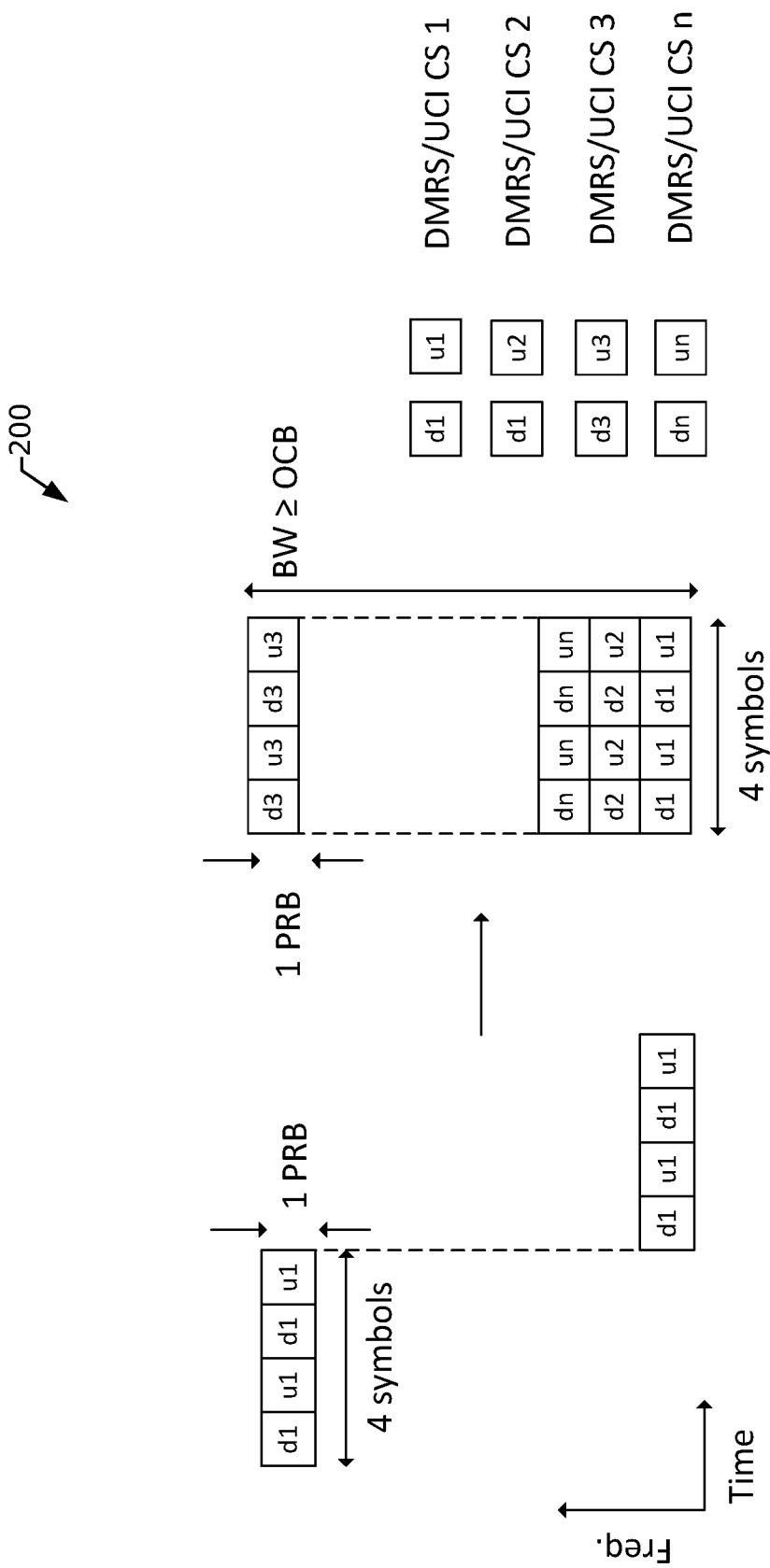

OCB is the occupied channel bandwidth criteria mandated by regulation (for example, 80%-100% of nominal channel bandwidth or temporally, 2 MHz bandwidth) and SCS is sub-carrier spacing (for example, in FR1, SCS for PUCCH maybe 15/30/60 KHz). Appropriate scaling would be applied in the above expression of n if OCB and SCS are expressed in different units. FIGS. 1 and 2 illustrate enhancements of PUCCH format 0 and PUCCH format 1 from single PRB to multiple PRBs (n) with disabled frequency hopping.

FIG. 1 shows an example enhancement of 2-symbol PUCCH format 0 from single PRB with enabled intra-slot frequency hopping to n contiguous PRBs with disabled intra-slot frequency hopping according to various embodiments.

Note that, if allowed by regulation, OCB can be met using frequency hopping as well, so that the combined bandwidth of PUCCH in two hops meets OCB requirement, while BW of each frequency hop can be less than OCB. In this case, each hop can have single PRB or more than one PRBs.

In one embodiment, Table 1 can be enhanced by providing additional parameters, which can either be pre-configured, or indicated by higher layer signaling (via MSI, RMSI or OSI), or can be implicitly derived in order to support contiguous allocation of n PRBs using PUCCH formats 0 and 1 for PUCCH resource set configuration before RRC connection setup. Example of such parameters are shown by Table 2.

TABLE 2

| Additional Parameters | Value |
|---|---|
| Number of PRBs (n) | n ≥ 12/6/3 for SCS = 15/30/60 KHz |
| Cyclic shift offset applied on n PRBs | $\Delta_{CS\text{-}offset}$ |
| Intra-slot frequency hopping | 0 (disabled) or 1 (enabled) |

Table 2 shows additional parameters to enhance PUCCH resource set configuration from single PRB in NR-licensed to multiple PRBs in NR-unlicensed using contiguous allocation (using PUCCH formats 0 and 1). $\Delta_{CS\text{-}offset}$ can either be a fixed offset, or a pattern of CS offsets which can be predefined in 3GPP specification, or configured via higher layer signaling or derived implicitly as a function of other parameters (e.g., PUCCH resource index, symbol/slot index etc.). Similarly, n can either be predefined, or can be configured by higher layer signaling, or can be a combination thereof (e.g., it can be predefined, but that value can be overwritten by higher layer signaling).

In another embodiment, the additional parameters mentioned above are incorporated in defining the parameters that are implicitly derived for PUCCH resource configuration during initial access, for example, PRB index in the $1^{st}$ hop, PRB index in the $2^{nd}$ hop and initial CS index in the set of CS indexes. Since single PRB PUCCH resource (as in NR-licensed) is enhanced to multi-PRB in NR-unlicensed, PRB index of the $i^{th}$ PRB in the $1^{st}$ and $2^{nd}$ hops (when frequency hopping is enabled) can be redefined as:

PRB index ($1^{st}$ hop) =

$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH}-8)/N_{CS} \rfloor - (i-1), & \text{otherwise} \end{cases}$$

PRB index ($2^{nd}$ hop) =

$$\begin{cases} RB_{BWP}^{offset} + \lfloor (r_{PUCCH}-8)/N_{CS} \rfloor + (i-1), & \text{if } \lfloor r_{PUCCH}/8 \rfloor = 1 \\ N_{BWP}^{size} - 1 - RB_{BWP}^{offset} - \lfloor r_{PUCCH}/N_{CS} \rfloor - (i-1), & \text{otherwise} \end{cases}$$

where, i=1, 2, ..., n. If frequency hopping is disabled, then the PRB indexes can be derived as:

PRB index($i^{th}$ PRB)=$RB_{BWP}^{offset}$+$\lfloor r_{PUCCH}/N_{CS} \rfloor$+(i−1), i=1,2,...,n Likewise, the CS index applied on the ith PRB can be defined as (initial CS index+$\Delta_{CS\text{-}offset,i}$) mod L, where $\Delta_{CS\text{-}offset,i}$ is the i-th element of an array of n different CS indexes either pre-defined in the spec, or configured via higher layer signaling, or implicitly derived as a function of other system parameters and L is the maximum allowed CS value (e.g., L=12). Alternatively, the CS index applied on the ith PRB can be defined as (initial CS index+i*$\Delta_{CS\text{-}offset}$) mod L, where i=1, 2, ..., n, L is the maximum allowed CS value and $\Delta_{CS\text{-}offset}$ is a fixed offset either pre-defined in the spec or is configured by higher layer signaling. Here, initial CS index can be derived similar to NR-licensed system, e.g., from the set of initial CS indexes (last column of Table 1), the initial CS index is chosen as the jth index within the set, where if frequency hopping is enabled, $$j = \begin{cases} r_{PUCCH} \bmod N_{CS}, & \text{if } \lfloor \frac{r_{PUCCH}}{8} \rfloor = 0 \\ (r_{PUCCH}-8) \bmod N_{CS}, & \text{if } \lfloor \frac{r_{PUCCH}}{8} \rfloor = 1 \end{cases}$$

And when frequency hopping is disabled, j=$r_{PUCCH}$ mod $N_{CS}$.

In another embodiment, other parameters in Table 1 can be modified, for example, the first symbol and/or the number of symbols.

In another embodiment, the existing value(s) of PRB offset ($RB_{BWP}^{offset}$) can be modified, for example, by scaling the existing values to n*existing value (where 0<n<1) or configuring new values that are not necessarily scaled version of the existing values, so as to make sure OCB requirement can be met. For example, the maximum value of PRB offset in Table 1, viz. $\lfloor N_{BWP}^{size}/4 \rfloor$ can be reduced, when 80% OCB is mandated by regulation.

FIG. 2 shows an example enhancement of 8-symbol PUCCH format 1 from single PRB with enabled intra-slot frequency hopping to n contiguous PRBs with disabled intra-slot frequency hopping, according to various embodiments.

3.1.2. Embodiment 1-2: Using PUCCH Formats 2 and 3

In another embodiment, PUCCH resource set before RRC connection set up can be configured using other inherent multi-PRB PUCCH formats from NR-licensed, for example, PUCCH formats 2 and 3. Each of these formats can be configured with n PRBs mapped contiguously across frequency in order to meet OCB requirement, where n≥⌈{OCB/(12*SCS)}⌉.

Note that, if allowed by regulation, OCB can be met using frequency hopping as well, so that the combined bandwidth of PUCCH in two hops meets OCB requirement, while BW of each frequency hop can be less than OCB. In this case, each hop can have single PRB or more than one PRBs. As one example, PUCCH format 4 (single-PRB format) with enabled frequency hopping can also be considered for PUCCH resource configuration.

Additionally, if PUCCH formats 2/3 are used for PUCCH resource configuration during initial access, some of the parameters may need to be revised, since those parameters may not be available during initial access. As one example, cell radio network temporary identifier (C-RNTI) is not available during initial access, which is used in Rel-15 as scrambling ID for initializing scrambling sequence for encoded UCI bits. So, instead of C-RNTI, TC-RNTI (temporary C-RNTI) available during initial access may be used as scrambling ID.

In one embodiment, the second column of Table 1 namely "PUCCH format" can be modified to configure PUCCH formats 2 and 3 replacing PUCCH formats 0 and 1. In addition, the last column of Table 1, e.g., "set of initial CS indexes" can be modified to "set of initial indexes", which can be time domain/frequency domain shift index for PUCCH formats 2/3. Note that, to enable time domain multiplexing, column 4 of Table 1 (number of symbols) may be modified such that the time shifted PUCCH resource does not cross the slot boundary. Additionally, PUCCH resources configured with PUCCH formats 2/3 may not always be aligned with the slot boundary.

In another embodiment, the parameters that are implicitly derived for PUCCH resource configuration during initial access, for example, PRB index in the 1st hop, PRB index in the 2nd hop and initial shift index in the set of shift indexes, are enhanced to multi-PRB PUCCH resource configuration in NR-unlicensed. For example, ith PRB index in the 1st and 2nd hops (when frequency hopping is enabled) can be redefined as PRB index (1$^{st}$ hop) =
$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH}-8)/N_{CS} \rfloor - (i-1), & \text{otherwise} \end{cases}$$

PRB indexes (2$^{nd}$ hop) ==
$$\begin{cases} RB_{BWP}^{offset} + \lfloor (r_{PUCCH}-8)/N_{CS} \rfloor + (i-1), & \text{if } \lfloor r_{PUCCH}/8 \rfloor = 1 \\ N_{BWP}^{size} - 1 - RB_{BWP}^{offset} - \lfloor \frac{r_{PUCCH}}{N_{CS}} \rfloor - (i-1), & \text{otherwise} \end{cases}$$

Where, i=1, 2, . . . , n and $N_{CS}$ denotes total number of shift indexes which can be a time domain shift, or frequency domain shift. If frequency hopping is disabled, then the PRB indexes can be derived as:

PRB index($i^{th}$ PRB)=$RB_{BWP}^{offset}$+⌊$r_{PUCCH}/N_{CS}$⌋+(i−1),i=1,2, . . . ,n Other modifications of Table 1 mentioned in the previous embodiment (using PUCCH formats 0/1), for example, modification of the values of PRB offset, first symbol, number of symbols etc. and inclusion of parameters like number of PRBs (n), intra-slot frequency hopping etc. are also applicable here.

3.2. Embodiment 2: Enhancements to PUCCH Resource Sets Configuration During Initial Access with Non-Contiguous PRB Allocation

3.2.1. Embodiment 2-1: Using PUCCH Formats 0 and 1

In embodiments, PUCCH resource set before RRC connection set up can be configured using existing PUCCH formats used in NR-licensed operation, e.g., PUCCH formats 0 and 1 which are inherently single-PRB (each PRB consisting of 12 sub-carriers) PUCCH formats. Both these single-PRB PUCCH formats can be enhanced to multiple PRBs (e.g., n PRBs, n≥2). Further, these n PRBs can be allocated non-contiguously in frequency (e.g., by using PRB based interlace), with inter-PRB distance m in between two consecutive PRBs such that OCB requirement is met. For example, [(n−1)*m+1]*(12*SCS)≥OCB.

Figure 3:
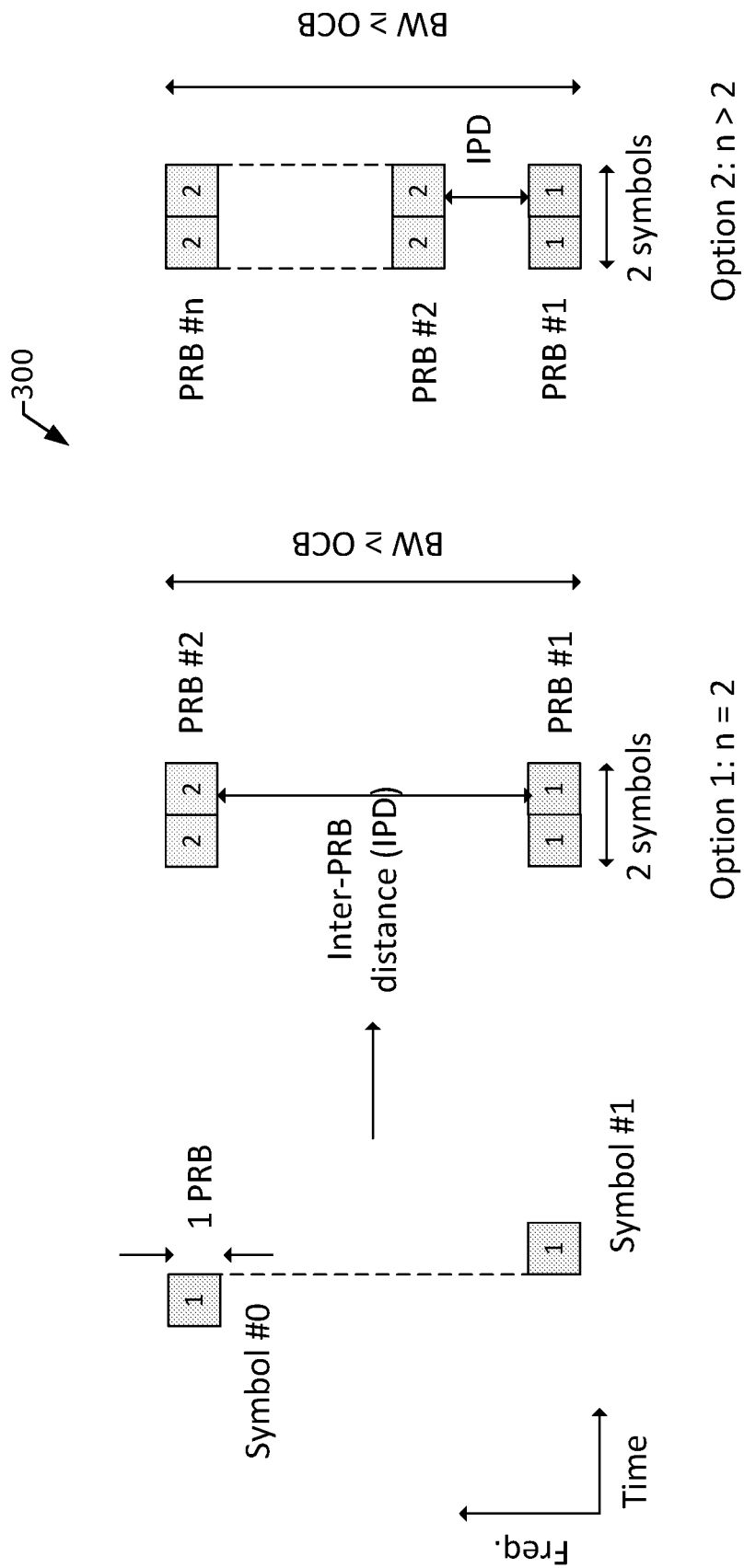
Figure 4:
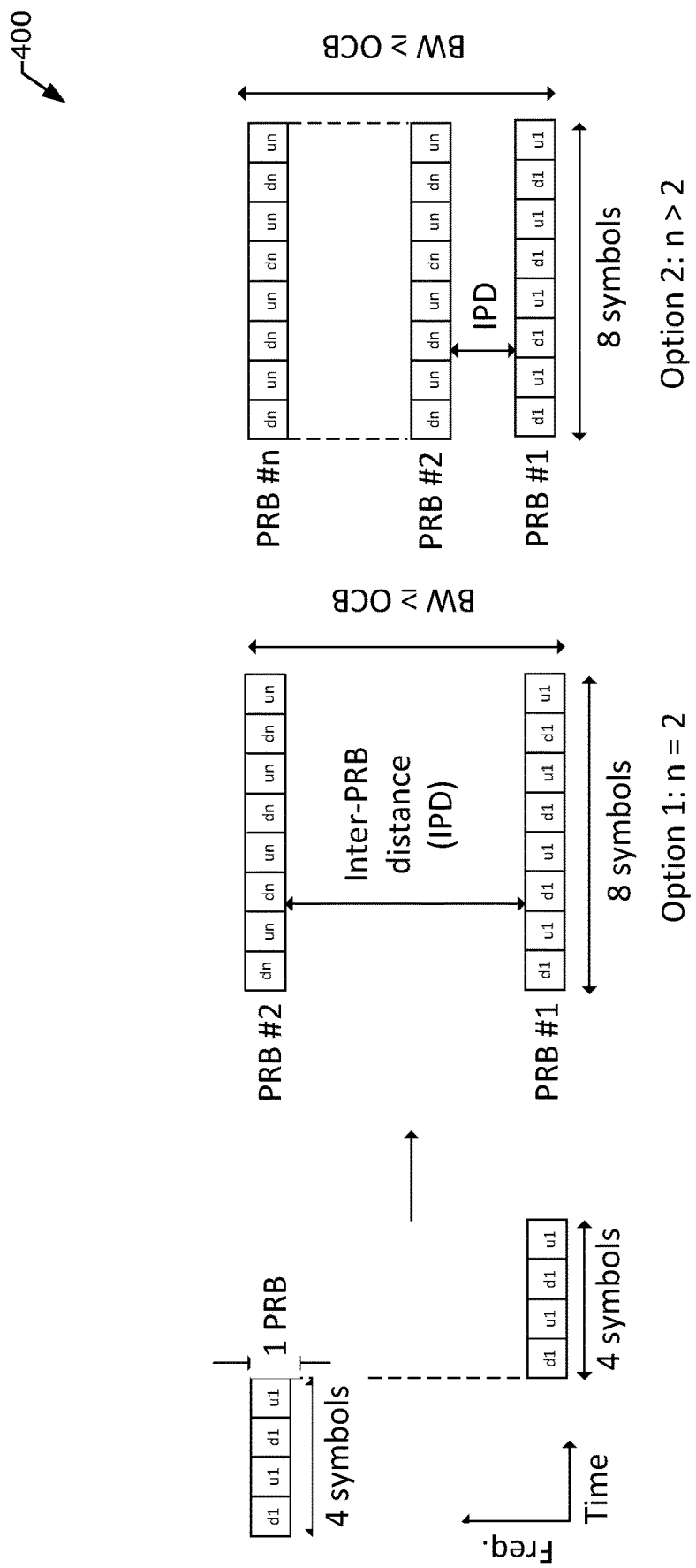

Note that, an interlace-based design with number of PRBs per interlace, n=2 can be sufficient to meet OCB requirement by setting appropriate inter-PRB distance (m), while n>2 can be used in some cases as well, for example, to boost transmission power by exploiting PSD regulation (e.g., 10 dBm/11 MHz) and setting inter-PRB distance (m) accordingly (e.g., m is such that 12*SCS (in MHz)*m>1 MHz). FIGS. 3 and 4 illustrate enhancements of PUCCH format 0 and PUCCH format 1 from single PRB to multiple PRBs (n) without frequency hopping.

In particular, FIG. 3 show an example enhancement of 2-symbol PUCCH format 0 from single PRB (with frequency hopping) to n non-contiguous PRBs (n=2 and n>2) without frequency hopping, according to various embodiments (legends for FIG. 3 are shown in FIG. 1).

In one embodiment, Table 1 can be enhanced by providing additional parameters, which can either be pre-configured, or indicated by higher layer signaling (via MSI, RMSI or OSI), or can be implicitly derived in order to support non-contiguous allocation of n PRBs using PUCCH formats 0 and 1 for PUCCH resource set configuration before RRC connection setup. Examples of such parameters are enlisted in Table 3

TABLE 3

| Additional Parameters | Value |
|---|---|
| Number of PRBs (n) | n ≥ 2 |
| Inter-PRB distance (m) | 12 * SCS (in MHz) * m > 1 MHz |
| Cyclic shift offset applied on n PRBs | $\Delta_{CS\text{-}offset}$ |
| Intra-slot frequency hopping | 0 (disabled) |

Table 3 shows additional parameters to enhance PUCCH resource set configuration from single PRB in NR-licensed to multi-PRB in NR-unlicensed using non-contiguous frequency allocation (using PUCCH formats 0 and 1). $\Delta_{CS\text{-}offset}$ can either be a fixed offset, or a pattern of CS offsets which can be predefined in specification, or configured via higher layer signaling or derived implicitly as a function of other parameters (e.g., PUCCH resource index, symbol/slot index etc.). Similarly, (n, m) can either be predefined, or can be configured by higher layer signaling, or can be a combination thereof (e.g., it can be predefined, but that value can be overwritten by higher layer signaling). Intra-slot frequency hopping can be disabled (in contrary to NR-licensed operation, where it is always enabled for PUCCH resource configuration during initial access) since frequency diversity can be already be achieved by non-contiguous frequency allocation.

In another embodiment, some implicitly derived PUCCH resource parameters in NR-licensed, such as PRB index of the 1st and 2nd hops can be repurposed to support PUCCH resource configuration with interlace-based PRB allocation in NR-unlicensed. For example, with n=2 and intra-slot frequency hopping disabled, PRB index of the 1st and 2nd PRBs can be implicitly derived instead of PRB indexes of 1st and 2nd hops. As one example, PRB index($1^{st}$ PRB)=$\lfloor r_{PUCCH}/N_{CS} \rfloor$ PRB index($2^{nd}$ PRB)=$N_{BWP}^{size}-1-\lfloor ((r_{PUCCH,max}-r_{PUCCH})/N_{CS} \rfloor$ Alternatively, PRB index of the 2nd PRB can be derived as PRB index (2nd PRB)=$N_{BWP}^{size}-1-\lfloor r_{PUCCH}/N_{CS} \rfloor$.

More generally, PRB index of the 2nd PRB can be selected as an offset from the PRB index of the 1st PRB, while the offset is IPD (as mentioned earlier) and the existing parameter $RB_{BWP}^{offset}$ is revised to indicate IPD (m) of the interlace based structure. Then, PRB index (2nd PRB)=PRB index (1st PRB)+($RB_{BWP}^{offset}$+1).

In general, when n>2, PRB index of the 1st PRB can be derived as mentioned above and the PRB index of ith PRB of the interlace can be derived as:

PRB index($i^{th}$ PRB)=PRB index($1^{st}$ PRB)+ {($RB_{BWP}^{offset}$+1)*(i-1)}

Where $RB_{BWP}^{offset}$ is the inter-PRB distance and i=1, 2, 3, . . . , n. Likewise, the CS index applied on the ith PRB can be defined as (initial CS index+$\Delta_{CS\text{-}offset,i}$) mod L, where $\Delta_{CS\text{-}offset,i}$ is the i-th element of an array of n different CS indexes either pre-defined in the spec, or configured via higher layer signaling, or implicitly derived as a function of other system parameters and L is the maximum allowed CS value (e.g., L=12). Alternatively, the CS index applied on the ith PRB can be defined as (initial CS index+i*$\Delta_{CS\text{-}offset}$) mod L, where i=1, 2, . . . , n, L is the maximum allowed CS value and $\Delta_{CS\text{-}offset}$ is a fixed offset either pre-defined in the spec or is configured by higher layer signaling. Here, initial CS index can be derived similar to NR-licensed system, e.g., from the set of initial CS indexes (last column of Table 1), the initial CS index is chosen as the jth index within the set, where j=$r_{PUCCH}$ mod $N_{CS}$.

In another embodiment, PRB offset ($RB_{BWP}^{offset}$) can be interpreted as starting interlace index, where the interlace indices (and the associated set of PRBs) are pre-defined in the specification for each numerology (combination of sub-carrier spacing and bandwidth) and the interlace indices of all the interlaces corresponding to a given PUCCH resource index (e.g., column 1 of Table 1) can be derived using some implicit/pre-defined rule. As one example, the interlace indices can be derived using the formulae used in Rel-15 for deriving PRB index of the 1st PRB in the 1st frequency hop, e.g., $RB_{BWP}^{offset}+\lfloor r_{PUCCH}/N_{CS} \rfloor$ for any value of $r_{PUCCH}$ (e.g., 0≤$r_{PUCCH}$≤15). Additionally, the values of $RB_{BWP}^{offset}$ in column 5 of Table 1 are modified such that the interlace index is within a predefined range, for example, interlace index(s) are less than 5 for 30 KHz SCS and less than 10 for 15 KHz SCS, since the number of available interlaces for 15 KHz SCS is 10 (indexed 0-9) and that for 30 KHz SCS is 5 (indexed 0-4).

In another embodiment, the last column of Table 1 is enhanced, e.g., set of initial CS indexes is modified, such that interlace index(s) derived using the formula $RB_{BWP}^{offset}+\lfloor r_{PUCCH}/N_{CS} \rfloor$ do not exceed the pre-defined range of interlace indexes allowed for a given numerology (SCS-BW combination). As one example, for 15/30 KHz SCS, $N_{CS}$ (number of CS indexes) for a given $RB_{BWP}^{offset}$ should be such that the resultant interlaces index(s), viz. $RB_{BWP}^{offset}+\lfloor r_{PUCCH}/N_{CS} \rfloor$ is within the range (0 to 9)/(0 to 5). Here, the initial CS index denotes the CS to be applied on the first PRB of the allocated interlace and the CS indexes to be applied on the other PRBs of the interlace can be derived from some predefined rule (e.g., CS index on the i-th PRB is the CS index applied on the first PRB+an offset).

In another embodiment, corresponding to one PUCCH resource index (the first column of Table 1), a set of first symbols can be defined, e.g., instead of a single value in column 3 ("First symbol"), multiple values can be defined. In this case, the PUCCH resource may not always be aligned with the slot boundary. As one example, corresponding to index 0-2 in Table 1, the "First symbol" in column 3 of Table 1 can be enhanced from a single value of "12" to a set of first symbols chosen from the set of values {0, 1, . . . , 11}. Additionally, the set of values chosen may be such that the "First symbols" are not consecutive, in order to keep LBT gap between configured first symbols to different PUCCH resources (corresponding to a given index) potentially assigned to different UEs. As one example, the set of first symbols can be {0, 3, 6, 9, and 12} for index 0-2. Note that, if there are N number of first symbols, N number of PUCCH resources will be TDM'd, corresponding to a given PUCCH resource set index. Alternatively, the entries of column 3 (First symbol) can be modified, while still maintaining one starting symbol configuration corresponding to each PUCCH resource set index. As one example, instead of First symbol=12 for PUCCH resource index 0-2, different First symbol location can be configured (e.g., any value between 0 and 11). Note that the PUCCH transmission will not necessarily align with slot boundary in this case.

In another embodiment, the existing values of column 4 (Number of symbols) of Table 1 can be modified, potentially to create more TDM'd PUCCH resources, in conjunction with multiple "First symbol" configurations (column 3 of Table 1) as mentioned above, for a given index (Column 1). As one example, corresponding to index 7-10 in column 1, the value of "Number of symbols" in column 4 of Table 1 can be modified to 6 (from 10) and the corresponding "First symbol" on column 3 of Table 1 can be changed from 4 to {0, 7} Or {0, 8} or {1, 8}. Two sets of non-overlapping, TDM'd PUCCH resources can be configured for a given index by such configuration.

In another embodiment, non-zero OCC index can be configured for PUCCH format 1 and/or format 0 to create another orthogonal dimension for PUCCH resources corresponding to an index (column 1 in Table 1). The set of OCC indexes corresponding to a given PUCCH resource index can be configured in a new column appended to the Table 1 (e.g., table 9.2.1-1 in [TS38213]).

In another embodiment, different tables can be defined for different numerologies. For example, two different tables can be defined for 15 KHz and 30 KHz SCS, since the number of available interlace indexes are different for these two SCS(s). Alternatively, the table defined for 30 KHz SCS (with less interlace indexes available) can be defined as the baseline and can be used for 15 KHz SCS (e.g., some interlace indexes available for 15 KHz SCS are not being used as PUCCH resources, for example, interlace index 5-9 are not used).

In another embodiment, the existing value(s) of PRB offset ($RB_{BWP}^{offset}$) can be modified so as to make sure OCB requirement can be met. For example, the maximum value of PRB offset in Table 1, viz. $\lfloor N_{BWP}^{size}/4 \rfloor$ can be reduced, when 80% OCB is mandated by regulation.

FIG. 4 shows an example enhancement of 8-symbol PUCCH format 1 from single PRB (with frequency hopping) to n non-contiguous PRBs (n=2 and n>2) without frequency hopping (legends for FIG. 4 are shown in FIG. 2).

In various embodiments, Table 1 can be modified such that corresponding to each PUCCH resource set index, $n_1$, $n_2$ and $n_3$ number of time, frequency and code domain resources are configured such that $n_1 * n_2 * n_3 \geq N$, where N is the number of PUCCH resources corresponding to each PUCCH resource set index, for example, N=16. There are different ways in which $n_1$, $n_2$, $n_3$ resources can be configured. As an example, the following configurations can be considered for N=16:

(1) PUCCH format 0 (example, index 0~2 in Table 1): each PUCCH resource set index can be configured with:
  a. 4 starting symbol locations, 2 interlace indexes, 2 cyclic shifts (or 1 CS+1 OCC)
  b. 4 starting symbol locations, 1 interlace index, 4 cyclic shifts (or 2 CSs+2 OCCs)
  c. 3 starting symbol locations, 3 interlace indexes, 2 cyclic shifts (or 1 CS+1 OCC)
  d. 3 starting symbol locations, 2 interlace indexes, 3 cyclic shifts (or 2 CSs+2 OCCs)
  e. 3 starting symbol locations, 1 interlace index, 6 cyclic shifts (or 3 CSs+2 OCCs)
  f. 2 starting symbol locations, 3 interlace indexes, 3 cyclic shifts (or 2 CSs+2 OCCs)
  g. 2 starting symbol locations, 2 interlace indexes, 4 cyclic shifts (or 2 CSs+2 OCCs)
  h. 2 starting symbol locations, 1 interlace index, 8 cyclic shifts (or 4 CSs+2 OCCs)
  i. 1 starting symbol location, 4 interlace indexes, 4 cyclic shifts (or 2 CSs+2 OCCs)
  j. 1 starting symbol location, 3 interlace indexes, 6 cyclic shifts (or 3 CSs+2 OCCs)
  k. 1 starting symbol location, 2 interlace indexes, 8 cyclic shifts (or 4 CSs+2 OCCs)

(2) PUCCH format 1 (example, index 3~15 in Table 1): each PUCCH resource set index can be configured with:
  a. For duration of length 4 (e.g., index 3~6 of Table 1)
    i. 4 starting symbol locations, 2 interlace indexes, 2 code domain resources (CS or CS+OCC)
    ii. 4 starting symbol locations, 1 interlace index, 4 code domain resources
    iii. 3 starting symbol locations, 3 interlace indexes, 2 code domain resources
    iv. 3 starting symbol locations, 2 interlace indexes, 3 code domain resources
    v. 3 starting symbol locations, 1 interlace index, 6 code domain resources
    vi. 2 starting symbol locations, 3 interlace indexes, 3 code domain resources
    vii. 2 starting symbol locations, 4 interlace indexes, 2 code domain resources
    viii. 2 starting symbol locations, 2 interlace indexes, 4 code domain resources
    ix. 2 starting symbol locations, 1 interlace index, 8 code domain resources
    x. 1 starting symbol location, 4 interlace indexes, 4 code domain resources
    xi. 1 starting symbol location, 3 interlace indexes, 6 code domain resources
    xii. 1 starting symbol location, 2 interlace indexes, 8 code domain resources b. For duration of length 10 and length 14 (e.g., index 7~15 of Table 1)
    i. 1 starting symbol location, 4 interlace indexes, 4 code domain resources
    ii. 1 starting symbol location, 3 interlace indexes, 6 code domain resources
    iii. 1 starting symbol location, 2 interlace indexes, 8 code domain resources Note that, for any other duration of PUCCH format 1 than 4/10/14, if configured, the corresponding combination of time, frequency and code domain resources to generate N orthogonal PUCCH resources corresponding to each PUCCH resource set index can be derived in a similar way as is described above for length 4/10.

In another embodiment, a new table can be introduced for enabling cell-specific PUCCH resource set configuration using interlace based PUCCH format 0/1, which can be a modified/extended version of Table 1. More specifically, if a UE 502 does not have dedicated PUCCH resource configuration, provided by PUCCH-ResourceSet in PUCCH-Config, a PUCCH resource set is provided by pucch-ResourceCommon through an index to a row of Table 1x if configured with interlace based PUCCH resource (for example, provided with RRC parameter useInterlace-PUCCH-Common-r16) for transmission of HARQ-ACK information on PUCCH in an initial UL BWP of $N_{BWP}^{size}$ PRBs.

The PUCCH resource set includes sixteen resources, each corresponding to a PUCCH format, a first symbol for a PUCCH resource with format 1 or a set of first symbols for a PUCCH resource with format 0, a duration, a starting interlace index $I_{start}$, a orthogonal cover code (OCC) index set for a PUCCH resource with format 1 and a cyclic shift index set for a PUCCH transmission. The UE 502 transmits a PUCCH without frequency hopping. If a PUCCH resource is provided by pucch-ResourceCommon, the UE 502 determines the first symbol in the set of first symbols for a PUCCH resource with PUCCH format 0, or the orthogonal cover code index in the set of orthogonal cover code indexes for a PUCCH resource with PUCCH format 1 as $\lfloor r_{PUCCH}/8 \rfloor$.

If $\lfloor r_{PUCCH}/8 \rfloor = 0$ and a PUCCH resource is provided by pucch-ResourceCommon, the UE 502 determines the interlace index of the PUCCH transmission as $(I_{start} + \lfloor r_{PUCCH}/N_{CS} \rfloor) \bmod M$, where M is the number of interlaces defined in (see e.g., [TS38211]), and/or the UE 502 determines the initial cyclic shift index in the set of initial cyclic shift indexes as $r_{PUCCH} \bmod N_{CS}$. $N_{CS}$ is the total number of initial cyclic shifts indexes in the set of initial cyclic shift indexes in Table 1 and/or Table 1x.

If $\lfloor r_{PUCCH}/8 \rfloor = 1$ and a PUCCH resource is provided by pucch-ResourceCommon, the UE 502 determines the interlace index of the PUCCH transmission as $(I_{start} + \lfloor (r_{PUCCH} - 8)/N_{CS} \rfloor) \bmod M$, and/or the UE 502 determines the initial cyclic shift index in the set of initial cyclic shift indexes as $(r_{PUCCH} - 8) \bmod N_{CS}$. $N_{CS}$ is the total number of initial cyclic shifts indexes in the set of initial cyclic shift indexes in Table 1 and/or Table 1x.

TABLE 1x

PUCCH resource sets before dedicated
PUCCH resource configuration

| Index | PUCCH format | First symbol or set of first symbols | Number of symbols | Starting interlace index $I_{start}$ | Set of initial CS indexes | Set of orthogonal cover code indexes |
|---|---|---|---|---|---|---|
| 0 | 0 | {9, 12} | 2 | 0 | {0, 3} | — |
| 1 | 0 | {9, 12} | 2 | 0 | {0, 1, 2, 3} | — |
| 2 | 0 | {9, 12} | 2 | 3 | {0, 1, 2, 3} | — |
| 3 | 1 | 10 | 4 | 0 | {0, 6} | {0, 1} |
| 4 | 1 | 10 | 4 | 0 | {0, 3, 6, 9} | {0, 1} |
| 5 | 1 | 10 | 4 | 2 | {0, 3, 6, 9} | {0, 1} |
| 6 | 1 | 10 | 4 | 4 | {1, 4, 7, 10} | {0, 1} |
| 7 | 1 | 4 | 10 | 0 | {0, 6} | {0, 1} |
| 8 | 1 | 4 | 10 | 0 | {0, 3, 6, 9} | {0, 1} |
| 9 | 1 | 4 | 10 | 2 | {0, 3, 6, 9} | {0, 1} |
| 10 | 1 | 4 | 10 | 4 | {0, 3, 6, 9} | {2, 3} |
| 11 | 1 | 0 | 14 | 0 | {0, 6} | {0, 1} |
| 12 | 1 | 0 | 14 | 0 | {0, 3, 6, 9} | {0, 1} |
| 13 | 1 | 0 | 14 | 2 | {0, 3, 6, 9} | {0, 1} |
| 14 | 1 | 0 | 14 | 4 | {0, 3, 6, 9} | {2, 3} |
| 15 | 1 | 0 | 14 | 4 | {0, 3, 6, 9} | {4, 5} |

3.2.2. Embodiment 2-2: Using PUCCH Formats 2 and 3

In embodiments, PUCCH resource set before RRC connection set up can be configured using other PUCCH formats from NR-licensed, e.g., PUCCH formats 2 and 3. Each of these formats can be configured with n PRBs mapped non-contiguously across frequency (e.g., using PRB based interlace using n≥2), with inter-PRB distance m in between two consecutive PRBs such that OCB requirement is met. For example, [(n−1)*m+1]*(12*SCS)≥OCB Note that, an interlace-based design with number of PRBs per interlace, n=2 can be sufficient to meet OCB requirement by setting appropriate inter-PRB distance (m), while n>2 can be used in some cases as well, for example, to boost transmission power by exploiting PSD regulation (e.g., 10 dBm/1 MHz) and setting inter-PRB distance (m) accordingly (e.g., m is such that 12*SCS (in MHz)*m>1 MHz).

In one embodiment, the second column of Table 1 namely "PUCCH format" can be modified to configure PUCCH formats 2 and 3 replacing PUCCH formats 0 and 1. In addition, the last column of Table 1 (e.g., "set of initial CS indexes") can be modified to "set of initial indexes", which can be time domain/frequency domain shift index for PUCCH formats 2/3. Note that, to enable time domain multiplexing, column 4 of Table 1 (Number of symbols) may be modified such that the time shifted PUCCH resource does not cross the slot boundary. Additionally, PUCCH resources configured with PUCCH formats 2/3 may not be always aligned with the slot boundary.

Additionally, Table 1 can be enhanced by providing additional parameters, which can either be pre-configured, or indicated by higher layer signaling (via MSI, RMSI or OSI), or can be implicitly derived in order to support non-contiguous allocation of n PRBs using PUCCH formats 2 and 3 for PUCCH resource set configuration before RRC connection setup. Examples of such parameters are enlisted in Table 4.

TABLE 4

| Additional Parameters | Value |
|---|---|
| Number of PRBs (n) | n ≥ 2 |
| Inter-PRB distance (m) | 12 * SCS (in MHz) * m > 1 MHz |
| Intra-slot frequency hopping | 0 (disabled) |

Table 4 shows additional parameters to enhance PUCCH resource set configuration from single PRB in NR-licensed to multiple PRBs in NR-unlicensed using non-contiguous allocation (using PUCCH formats 2 and 3).

Intra-slot frequency hopping can be disabled (in contrary to NR-licensed operation, where it is always enabled for PUCCH resource configuration during initial access) since frequency diversity can be already be achieved by non-contiguous frequency allocation.

In another embodiment, some implicitly derived PUCCH resource parameters in NR-licensed, such as PRB index of the 1st and 2nd hops can be repurposed to support PUCCH resource configuration with interlace-based PRB allocation in NR-unlicensed. For example, with n=2 and intra-slot frequency hopping disabled, PRB index of the 1st and 2nd PRBs can be implicitly derived instead of PRB indexes of 1st and 2nd hops. As one example, $$\text{PRB index(1st PRB)} = \lfloor r_{PUCCH}/N_{CS} \rfloor$$

$$\text{PRB index(2nd PRB)} = N_{BWP}^{size} - 1 - \lfloor ((r_{PUCCH,max} - r_{PUCCH})/N_{CS} \rfloor$$

Alternatively, PRB index of the 2nd PRB can be derived as PRB index (2nd PRB)=$N_{BWP}^{size} - 1 - \lfloor r_{PUCCH}/N_{CS} \rfloor$.

More generally, PRB index of the 2nd PRB can be selected as an offset from the PRB index of the 1st PRB, while the offset is IPD (as mentioned earlier) and the existing parameter $RB_{BWP}^{offset}$ is revised to indicate IPD (m) of the interlace based structure. Then, $$\text{PRB index(2nd PRB)} = \text{PRB index(1st PRB)} + (RB_{BWP}^{offset} + 1)$$

In general, when n>2, PRB index of the 1st PRB can be derived as mentioned above and the PRB index of ith PRB of the interlace can be derived as $$\text{PRB index(ith PRB)} = \text{PRB index(1st PRB)} + \{(RB_{BWP}^{offset} + 1)*(i-1)\}$$

where $RB_{BWP}^{offset}$ is the inter-PRB distance and i=1, 2, 3, . . . , n and $N_{CS}$ denotes total number of shift indexes which can be a time domain shift, or frequency domain index. Other modifications of Table 1 mentioned in the previous embodiment (using PUCCH formats 0/1), for example, modification of the values of PRB offset etc. are also applicable here.

Note that, the above embodiments related to non-contiguous frequency allocation may also be applicable if frequency hopping is enabled. If frequency hopping is enabled, PRB indices of the 1st hop and 2nd hop would be additionally derived.

4. Enhancement of PUCCH Resource Configuration to Allow Multiple Time Domain Opportunities In one embodiment, multiple first symbols in a slot can also be defined corresponding to one row in the table (e.g., Table 1), so that listen-before-talk (LBT) congestion can be alleviated and depending on LBT outcome, the UE 502 can choose a first symbol for PUCCH transmission. Further, the UE 502 can apply puncturing or rate matching as appropriate. Alternatively, the last symbol of PUCCH is always aligned with slot boundary (e.g., when the first symbol is determined, the length of PUCCH transmission is also determined).

As an alternative, multiple slot opportunities can be configured for PUCCH transmission. In particular, a PUCCH transmission window can be defined wherein the window size can be configured via RMSI. In this case, UE 502 may transmit the PUCCH starting from the indicated slot. If the LBT fails, UE 502 may continue to try the next available UL slot for PUCCH transmission until the last slot in the window is reached. Note that in each slot, the same starting symbol is used for PUCCH transmission. In this case, the current starting symbol in the table can be maintained. Note that, this embodiment is applicable irrespective of PUCCH formats used for resource configuration and applicable to both contiguous and non-contiguous frequency allocations.

5. General Enhancements to Various PUCCH Formats for Configuring PUCCH Resource Sets During Initial Access For enhancement of PUCCH format 0 from single PRB to n PRBs (contiguous or non-contiguous or a combination thereof, where n≥2)), In one embodiment, the same length-12 base sequence can be mapped on n PRBs by applying n cyclic shifts. In particular, different cyclic shifts can be applied on different PRBs. The cyclic shift pattern in different PRBs can be predefined in the specification or configured by higher layer, e.g., via NR minimum system information (MSI), NR remaining minimum system information (RMSI) or NR other system information (OSI). Alternatively, the cyclic shift pattern in different PRBs can be defined as a function of PUCCH resource index, symbol/slot index, etc. In one embodiment, a constant cyclic shift offset can be applied on different PRBs.

In another embodiment, the same length-12 sequence (with the same cyclic shift) can be repeatedly mapped on n PRBs by applying additional phase offsets on each of these repetitions. The phase offsets can be predefined in the specification or randomly selected by the UE 502 or configured by higher layers via MSI, RMSI or OSI.

In another embodiment, different base sequences (with cyclic shift hopping and/or base sequence hopping being applied) can be mapped on n PRBs. Additional phase offsets may be applied on these n different base sequences.

Additionally, PUCCH format 0 can be enhanced from single PRB to n PRBs by mapping length-l low PAPR (peak-to-average power ratio) sequence (for example, Zadoff-Chu (ZC) sequence or computer generated sequence (CGS)) (where, l=m*12, m can be an integer and 1<m≤n) and mapped across n PRBs using similar embodiments (e.g., ⌊n/m⌋ different CS shifts/phase-offsets/base sequence with CS and/or base sequence hopping etc.) as mentioned above.

For enhancement of PUCCH format 1 from single PRB to n PRBs (contiguous or non-contiguous or a combination thereof, where n≥2)). In one embodiment, DMRS and UCI sequences can be mapped n times across frequency by applying n cyclic shifts. The cyclic shifts applied on DMRS sequences may be different than that applied on UCI sequences. For example, if n denotes the cyclic shift applied on DMRS sequences, the cyclic shift applied on UCI sequences may be $n_{UCI}$, where $n_{UCI}=(n+\nabla_{offset})$ mod 12, and where $\nabla_{offset}$ is pre-configured or provided by higher layer signaling via MSI, RMSI or OSI.

In another embodiment, the same DMRS and UCI sequences can be repeatedly mapped on n PRBs by applying additional phase offsets on each of these repetitions. The phase offsets applied on DMRS sequences may be different than that applied on UCI sequences.

In another embodiment, different base sequences (with cyclic shift hopping and/or base sequence hopping being applied) can be used for DMRS and spreading sequence of UCI to generate each of the n copies of PUCCH format 1, to be mapped on n PRBs. Additional phase offsets may be applied on these n different copies of PUCCH format 1, where the phase offsets applied on DMRS sequences may be different than that applied on UCI sequences.

Additionally, PUCCH format 1 can be enhanced from single PRB to n PRBs by using length-l low PAPR (peak-to-average power ratio) sequence (for example, Zadoff-Chu (ZC) sequence or computer generated sequence (CGS)) (where, l=m*12, m can be an integer and 1<m≤n) for DMRS and spreading sequence of UCI, and mapped across n PRBs using similar embodiments (e.g., ⌈n/m⌉ different CS shifts/phase-offsets/base sequence with CS and/or base sequence hopping etc.) as mentioned above.

For enhancement of PUCCH formats 2 and 3 to support UCI payload of <2 bits. In one embodiment, repetition or simplex coding scheme can be used to support encoding of 1~2 UCI bit(s). In another embodiment, zero padding can be used to increase the payload size to 3 bits and then the existing NR PUCCH format 2/3 encoding scheme for >2 UCI bits can be used.

In one embodiment, applying OCC can be an additional dimension to further randomize interference for PUCCH formats 0/2. E.g., for enhanced PUCCH format 0 with 2 symbols, length-2 OCC could be applied. The applied OCC index can be bound to cyclic shifts.

In another embodiment, new short and long PUCCH formats can be defined for interlace based (e.g., non-contiguous) frequency allocation of PUCCH resource configuration before initial access. While the short PUCCH format can be based on NR PUCCH formats 0/2 and the long PUCCH format can be based on NR PUCCH formats 1/3/4, the new formats designed for interlace based frequency allocation may have additional features. As one example, PUCCH formats 0/2 in NR could be extended to have more than 2 symbols (while PUCCH formats 0/2 in NR are restricted to maximum 2 symbols). Similarly, the new long PUCCH format spanning over more than 1 PRBs may have per PRB different OCCs applied over the multiple symbols for interference randomization.

6. Example Systems and Device Configurations and Arrangements

Figure 5:
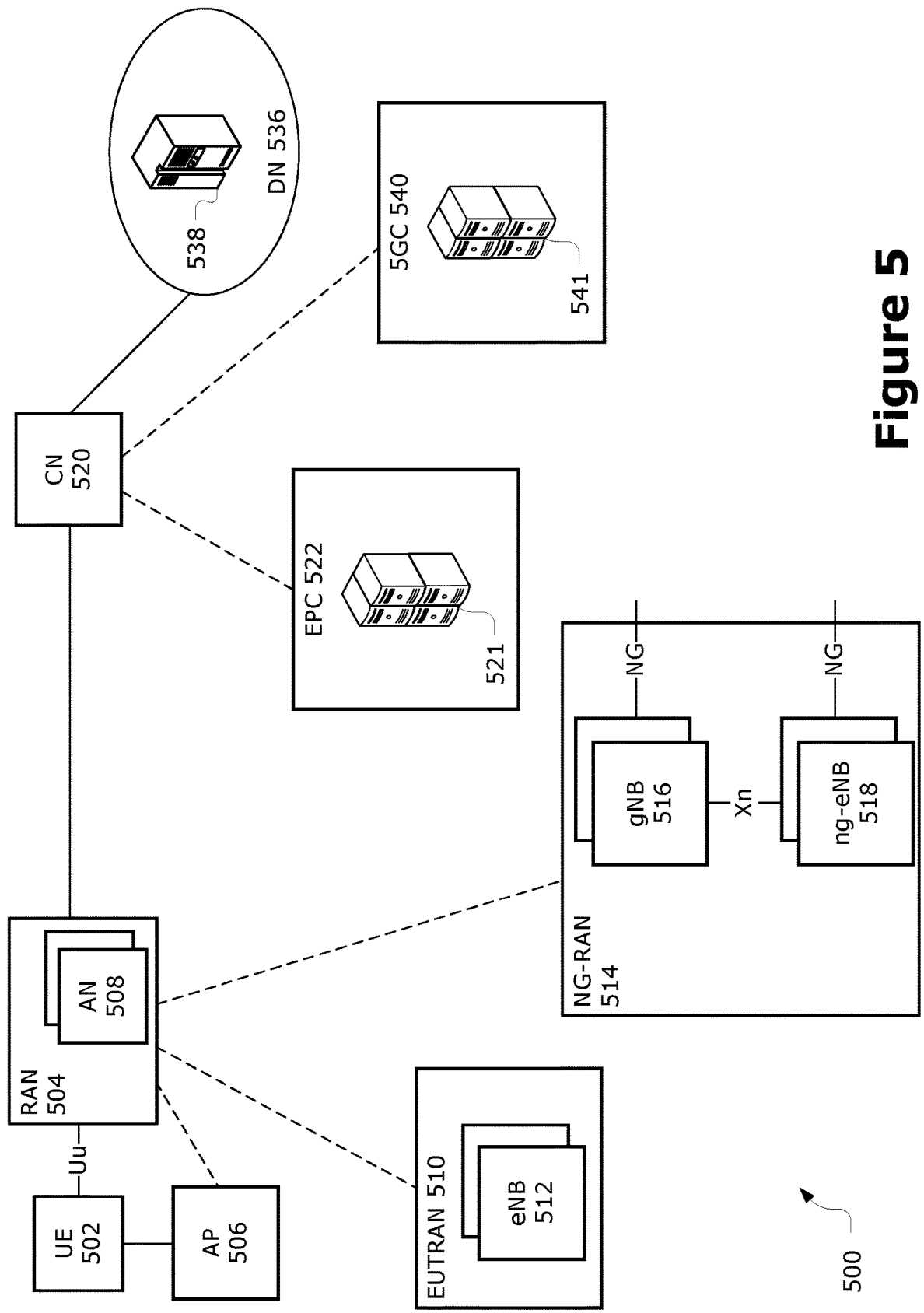
FIG. 5 illustrates an example network architecture according to various embodiments.

Referring now to FIG. 5, which illustrates a network 500 in accordance with various embodiments. The network 500 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 500 includes a UE 502, which is any mobile or non-mobile computing device designed to communicate with a RAN 504 via an over-the-air connection. The UE 502 is communicatively coupled with the RAN 504 by a Uu interface, which may be applicable to both LTE and NR systems. Examples of the UE 502 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 500 may include a plurality of UEs 502 coupled directly with one another via a D2D, ProSe, PC5, and/or sidelink (SL) interface. These UEs 502 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 502 may additionally communicate with an AP 506 via an over-the-air (OTA) connection. The AP 506 manages a WLAN connection, which may serve to offload some/all network traffic from the RAN 504. The connection between the UE 502 and the AP 506 may be consistent with any IEEE 802.11 protocol. Additionally, the UE 502, RAN 504, and AP 506 may utilize cellular-WLAN aggregation/integration (e.g., LWA/LWIP). Cellular-WLAN aggregation may involve the UE 502 being configured by the RAN 504 to utilize both cellular radio resources and WLAN resources.

The UE 502 may be configured to perform signal and/or cell measurements based on a configuration obtain from the network (e.g., RAN 504). The UE 502 derives cell measurement results by measuring one or multiple beams per cell as configured by the network. For all cell measurement results, the UE 502 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (2018-09-27) (hereinafter "[TS36214]"), 3GPP TS 38.215 v15.5.0 (2019 Jun. 24) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The RAN 504 includes one or more access network nodes (ANs) 508. The ANs 508 terminate air-interface(s) for the UE 502 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 508 enables data/voice connectivity between CN 520 and the UE 502. The UE 502 and can be configured to communicate using OFDM communication signals with other UEs 502 or with any of the AN 508 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

The ANs 508 may be a macrocell base station or a low power base station for providing femtocells, picocells or other like cells having smaller coverage areas, smaller user capacity, or higher bandwidth compared to macrocells; or some combination thereof. In these implementations, an AN 508 be referred to as a BS, gNB, RAN node, eNB, ng-eNB, NodeB, RSU, TRxP, etc.

One example implementation is a "CU/DU split" architecture where the ANs 508 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (2020-01-09)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 508 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 504 is an LTE RAN or Evolved Universal Terrestrial Radio Access Network (E-UTRAN) 510) or an Xn interface (if the RAN 504 is a NG-RAN 514). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs 508 of the RAN 504. For example, the UE 502 and RAN 504 may use carrier aggregation (CA) to allow the UE 502 to connect with a plurality of component carriers, each corresponding to a PCell or SCell. A PCell is an MCG cell, operating on a primary frequency, in which the UE 502 performs an initial connection establishment procedure and/or initiates a connection re-establishment procedure. An SCell is a cell providing additional radio resources on top of a Special Cell (SpCell) when the UE 502 is configured with CA. In CA, two or more Component Carriers (CCs) are aggregated. The UE 502 may simultaneously receive or transmit on one or multiple CCs depending on its capabilities. A UE 502 with single timing advance capability for CA can simultaneously receive and/or transmit on multiple CCs corresponding to multiple serving cells sharing the same timing advance (multiple serving cells grouped in one timing advance group (TAG)). A UE 502 with multiple timing advance capability for CA can simultaneously receive and/or transmit on multiple CCs corresponding to multiple serving cells with different timing advances (multiple serving cells grouped in multiple TAGs). The NG-RAN 514 ensures that each TAG contains at least one serving cell; A non-CA capable UE 502 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 502. In some implementations, the maximum number of configured CCs for a UE 502 is 16 for DL and 16 for UL.

In Dual Connectivity (DC) scenarios, a first AN 508 may be a master node that provides a Master Cell Group (MCG) and a second AN 508 may be secondary node that provides an Secondary Cell Group (SCG). The first and second ANs 508 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 502 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 504 may be an E-UTRAN 510 with one or more eNBs 512. The E-UTRAN 510 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 504 may be an next generation (NG)-RAN 514 with one or more gNB 516 and/or on or more ng-eNB 518. The gNB 516 connects with 5G-enabled UEs 502 using a 5G NR interface. The gNB 516 connects with a 5GC 540 through an NG interface, which includes an N2 interface or an N3 interface. The ng-eNB 518 also connects with the 5GC 540 through an NG interface, but may connect with a UE 502 via the Uu interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF (e.g., N3 interface), and an NG control plane (NG-C) interface, which is a signaling interface between the nodes of the NG-RAN 514 and an AMF (e.g., N2 interface).

The NG-RAN 514 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

The 5G-NR air interface may utilize bandwidth parts (BWPs) for various purposes. For example, BWP can be used for dynamic adaptation of the SCS. A BWP is a subset of contiguous common resource blocks defined in clause 4.4.4.3 of 3GPP TS 38.211 or a given numerology in a BWP on a given carrier. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (e.g., PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520, which includes network elements and/or network functions (NFs) to provide various functions to support data and telecommunications services to customers/subscribers (e.g., UE 502). The network elements and/or NFs may be implemented by one or more servers 521, 541. The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

The CN 520 may be an LTE CN 522 (also referred to as an Evolved Packet Core (EPC) 522). The EPC 522 may include MME, SGW, SGSN, HSS, PGW, PCRF, and/or other NFs coupled with one another over various interfaces (or "reference points") (not shown). The CN 520 may be a 5GC 540 including an AUSF, AMF, SMF, UPF, NSSF, NEF, NRF, PCF, UDM, AF, and/or other NFs coupled with one another over various service-based interfaces and/or reference points (see e.g., FIGS. 6 and 7). The 5GC 540 may enable edge computing by selecting operator/3rd party services to be geographically close to a point that the UE 502 is attached to the network. This may reduce latency and load on the network. In edge computing implementations, the 5GC 540 may select a UPF close to the UE 502 and execute traffic steering from the UPF to DN 536 via the N6 interface. This may be based on the UE subscription data, UE location, and information provided by the AF, which allows the AF to influence UPF (re)selection and traffic routing.

The data network (DN) 536 may represent various network operator services, Internet access, or third party services that may be provided by one or more servers including, for example, application (app)/content server 538. The DN 536 may be an operator external public, a private PDN, or an intra-operator packet data network, for example, for provision of IMS services. In this embodiment, the server 538 can be coupled to an IMS via an S-CSCF or the I-CSCF. In some implementations, the DN 536 may represent one or more local area DNs (LADNs), which are DNs 536 (or DN names (DNNs)) that is/are accessible by a UE 502 in one or more specific areas. Outside of these specific areas, the UE 502 is not able to access the LADN/DN 536.

Additionally or alternatively, the DN 536 may be an Edge DN 536, which is a (local) Data Network that supports the architecture for enabling edge applications. In these embodiments, the app server 538 may represent the physical hardware systems/devices providing app server functionality and/or the application software resident in the cloud or at an edge compute node that performs server function(s). In some embodiments, the app/content server 538 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 510, 514. For example, the edge compute nodes can provide a connection between the RAN 514 and UPF in the 5GC 540. The edge compute nodes can use one or more NFV instances instantiated on virtualization infrastructure within the edge compute nodes to process wireless connections to and from the RAN 514 and a UPF 602.

In some implementations, the system 500 may include an SMSF, which is responsible for SMS subscription checking and verification, and relaying SM messages to/from the UE 502 to/from other entities, such as an SMS-GMSC/IWMSC/SMS-router. The SMS may also interact with AMF and UDM for a notification procedure that the UE 502 is available for SMS transfer (e.g., set a UE not reachable flag, and notifying UDM when UE 502 is available for SMS).

Figure 6:
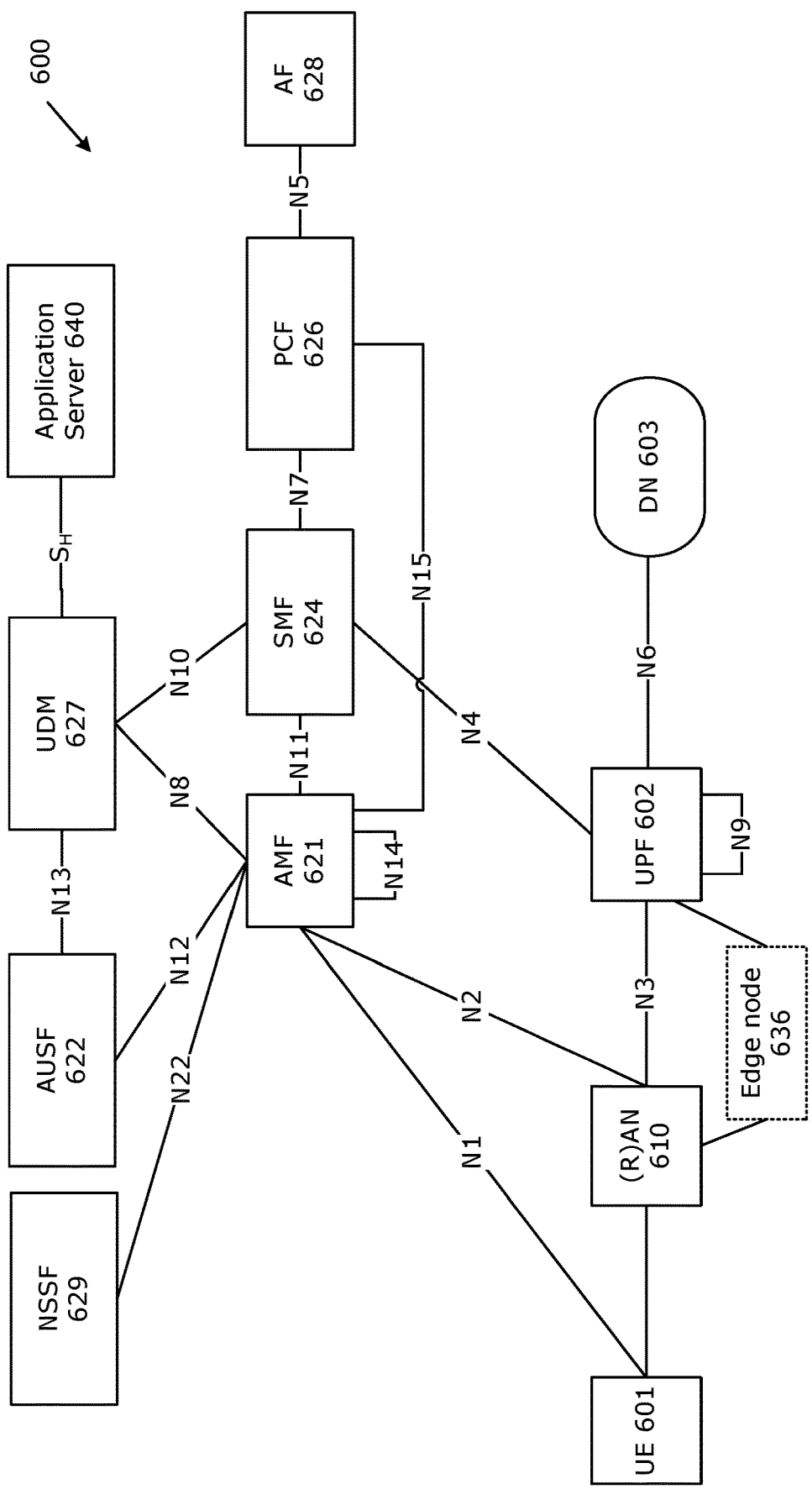
FIGS. 6 and 7 illustrate example core network architectures according to various embodiments.
Figure 7:
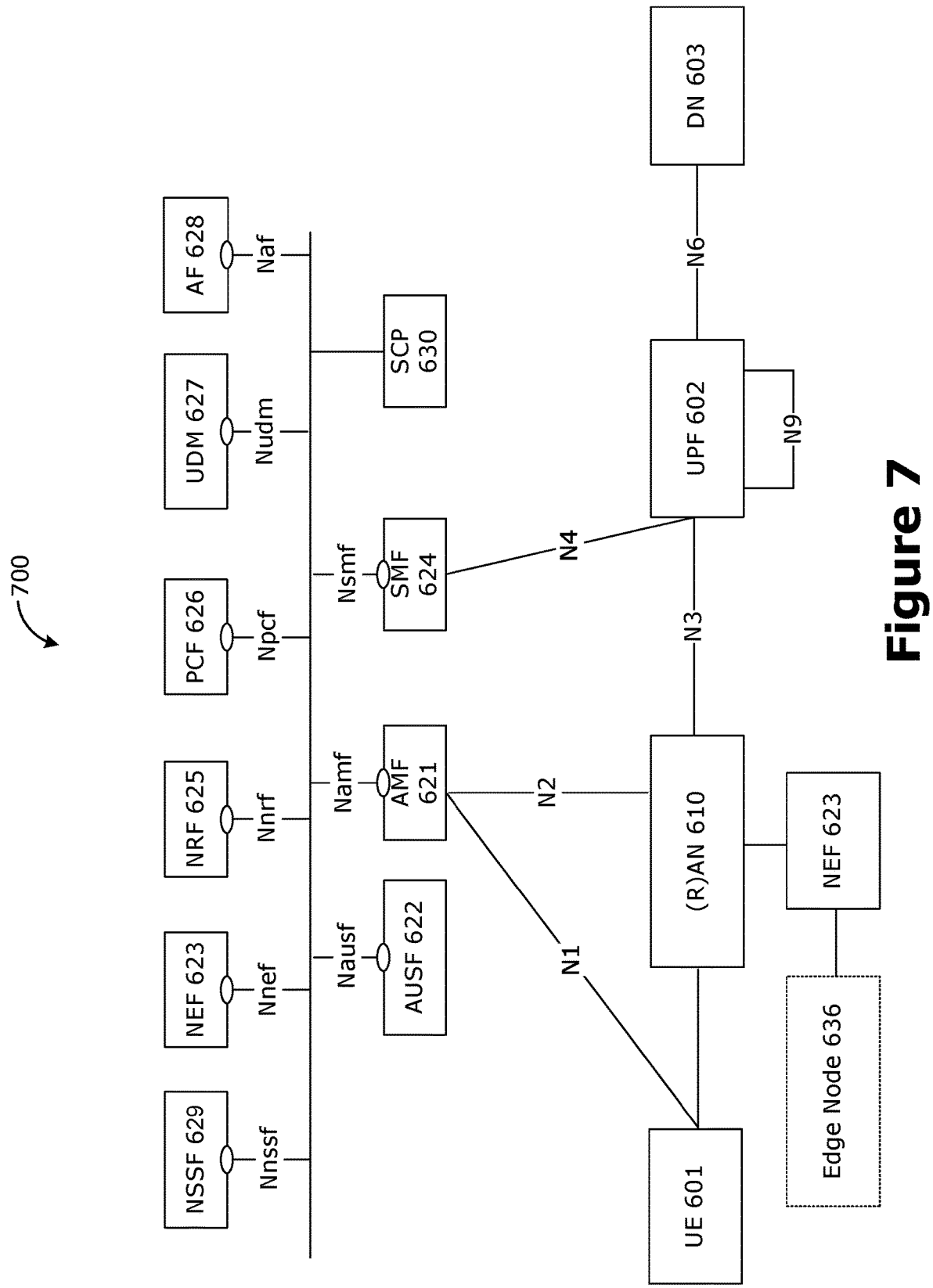

FIGS. 6 and 7 illustrate example system architectures 600 and 700 (collectively "5GC 600") of a 5GC such as CN 540 of FIG. 5, in accordance with various embodiments. In particular, FIG. 6 shows an exemplary 5G system architecture 600 in a reference point representation where interactions between NFs are represented by corresponding point-to-point reference points Ni, and FIG. 7 illustrates an exemplary 5G system architecture 700 in a service-based representation where interactions between NFs are represented by corresponding service-based interfaces. The system 600 is shown to include a UE 601, which may be the same or similar to the UEs 502 discussed previously; a (R)AN 610, which may be the same or similar to the AN 508 discussed previously; and a DN 603, which may be, for example, operator services, Internet access or 3rd party services, and may correspond with a Packet Data Network in LTE systems; and a 5GC 620. The 5GC 620 may include an an Access and Mobility Management Function (AMF) 621; an Authentication Server Function (AUSF) 622; a Session Management Function (SMF) 624; a Network Exposure Function (NEF) 623; a Policy Control Function (PCF) 626; an NF Repository Function (NRF) 625; a Unified Data Management (UDM) 627; an Application Function (AF) 628; a User Plane Function (UPF) 602; a Network Slice Selection Function (NSSF) 629; and a Service Communication Proxy (SCP) 630.

The reference point representation of FIG. 6 shows various interactions between corresponding NFs. For example, FIG. 6 illustrates the following reference points: N1 (between the UE 601 and the AMF 621), N2 (between the RAN 610 and the AMF 621), N3 (between the RAN 610 and the UPF 602), N4 (between the SMF 624 and the UPF 602), N5 (between the PCF 626 and the AF 628), N6 (between the UPF 602 and the DN 603), N7 (between the SMF 624 and the PCF 626), N8 (between the UDM 627 and the AMF 621), N9 (between two UPFs 602), N10 (between the UDM 627 and the SMF 624), N11 (between the AMF 621 and the SMF 624), N12 (between the AUSF 622 and the AMF 621), N13 (between the AUSF 622 and the UDM 627), N14 (between two AMFs 621), N15 (between the PCF 626 and the AMF 621 in case of a non-roaming scenario, or between the PCF 626 and a visited network and AMF 621 in case of a roaming scenario), N16 (between two SMFs; not shown), and N22 (between AMF 621 and NSSF 625). Other reference point representations not shown in FIG. 6 can also be used.

The service-based representation of FIG. 7 represents NFs within the control plane that enable other authorized NFs to access their services. In this regard, 5G system architecture 300 can include the following service-based interfaces: Namf (a service-based interface exhibited by the AMF 621), Nsmf (a service-based interface exhibited by the SMF 624), Nnef (a service-based interface exhibited by the NEF 623), Npcf (a service-based interface exhibited by the PCF 626), Nudm (a service-based interface exhibited by the UDM 627), Naf (a service-based interface exhibited by the AF 628), Nnrf (a service-based interface exhibited by the NRF 625), Nnssf (a service-based interface exhibited by the NSSF 629), Nausf (a service-based interface exhibited by the AUSF 622). Other service-based interfaces (e.g., Nudr, N5g-eir, and Nudsf) not shown in FIG. 7 can also be used. In embodiments, the NEF 623 can provide an interface to Edge node 636, which can be used to process wireless connections with the RAN 610.

The 5GS 600 is assumed to operate with a large number of UEs 601 used for CIoT and capable of appropriately handling overload and congestion situations. UEs 601 used for CIoT can be mobile or nomadic/static, and resource efficiency should be considered for both for relevant optimization(s). The 5GS 600 also supports one or more small data delivery mechanisms using IP data and Unstructured (Non-IP) data.

The AUSF 622 stores data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 allows other functions of the 5GC 600 to communicate with the UE 601 and the RAN 610 and to subscribe to notifications about mobility events with respect to the UE 601. The AMF 621 is also responsible for registration management (e.g., for registering UE 601), connection management, reachability management, mobility management, lawful interception of AMF-related events, and access authentication and authorization. The AMF 621 provides transport for SM messages between the UE 601 and the SMF 624, and acts as a transparent proxy for routing SM messages. AMF 621 also provides transport for SMS messages between UE 601 and an SMSF. AMF 544 interacts with the AUSF 622 and the UE 601 to perform various security anchor and context management functions. Furthermore, AMF 621 is a termination point of a RAN-CP interface, which includes the N2 reference point between the RAN 610 and the AMF 621. The AMF 621 is also a termination point of Non-Access Stratum (NAS) (N1) signaling, and performs NAS ciphering and integrity protection.

The AMF 621 also supports NAS signaling with the UE 601 over an N3IWF interface. The N3IWF provides access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 handles N2 signalling from the SMF 624 and the AMF 621 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 640 and an N17 reference point between the AMF 621 and a 5G-EIR (not shown by FIG. 5).

The SMF 624 is responsible for SM (e.g., session establishment, tunnel management between UPF 602 and (R)AN 610); UE IP address allocation and management (including optional authorization); selection and control of UP function; configuring traffic steering at UPF 602 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 621 over N2 to (R)AN 610; and determining SSC mode of a session. SM refers to management of a PDU session, and a PDU session or "session" refers to a PDU connectivity service that provides or enables the exchange of PDUs between the UE 601 and the DN 603.

The UPF 602 acts as an anchor point for intra-RAT and inter-RAT mobility, an external PDU session point of interconnect to data network 603, and a branching point to support multi-homed PDU session. The UPF 602 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 602 may include an uplink classifier to support routing traffic flows to a data network.

The NSSF 629 selects a set of network slice instances serving the UE 601. The NSSF 629 also determines allowed NSSAI and the mapping to the subscribed S-NSSAIs, if needed. The NSSF 629 also determines an AMF set to be used to serve the UE 601, or a list of candidate AMFs 621 based on a suitable configuration and possibly by querying the NRF 625. The selection of a set of network slice instances for the UE 601 may be triggered by the AMF 621 with which the UE 601 is registered by interacting with the NSSF 629; this may lead to a change of AMF 621. The NSSF 629 interacts with the AMF 621 via an N22 reference point; and may communicate with another NSSF in a visited network via an N31 reference point (not shown).

The NEF 623 securely exposes services and capabilities provided by 3GPP NFs for third party, internal exposure/re-exposure, AFs 628, edge computing or fog computing systems (e.g., edge compute node 636, etc. In such embodiments, the NEF 623 may authenticate, authorize, or throttle the AFs 628. NEF 623 may also translate information exchanged with the AF 628 and information exchanged with internal network functions. For example, the NEF 623 may translate between an AF-Service-Identifier and an internal 5GC information. NEF 623 may also receive information from other NFs based on exposed capabilities of other NFs. This information may be stored at the NEF 623 as structured data, or at a data storage NF using standardized interfaces. The stored information can then be re-exposed by the NEF 623 to other NFs and AFs 628, or used for other purposes such as analytics. External exposure of network capabilities towards Services Capabilities Server (SCS)/app server 640 or AF 628 is supported via the NEF 623. Notifications and data from NFs in the Visiting Public Land Mobile Network (VPLMN) to the NEF 623 can be routed through an interworking (IWK)-NEF (not shown), similar to the IWK-Service Capability Exposure Function (SCEF) in an EPC (not shown).

The NRF 625 supports service discovery functions, receives NF discovery requests from NF instances, and provides information of the discovered NF instances to the requesting NF instances. NRF 625 also maintains information of available NF instances and their supported services. The NRF 625 also supports service discovery functions, wherein the NRF 625 receives NF Discovery Request from NF instance or an SCP (not shown), and provides information of the discovered NF instances to the NF instance or SCP.

The PCF 626 provides policy rules to control plane functions to enforce them, and may also support unified policy framework to govern network behavior. The PCF 626 may also implement a front end to access subscription information relevant for policy decisions in a UDR of the UDM 627. In addition to communicating with functions over reference points as shown, the PCF 626 exhibit an Npcf service-based interface.

The UDM 627 handles subscription-related information to support the network entities' handling of communication sessions, and stores subscription data of UE 601. For example, subscription data may be communicated via an N8 reference point between the UDM 627 and the AMF 621. The UDM 627 may include two parts, an application front end and a UDR. The UDR may store subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 221 to allow the UDM 627, PCF 626, and NEF 623 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 627 may exhibit the Nudm service-based interface.

The AF 628 provides application influence on traffic routing, provide access to NEF 623, and interact with the policy framework for policy control. The AF 628 may influence UPF 602 (re)selection and traffic routing. Based on operator deployment, when AF 628 is considered to be a trusted entity, the network operator may permit AF 628 to interact directly with relevant NFs.

Additionally, the AF 628 may be used for edge computing implementations. The 5GC 600 may enable edge computing by selecting operator/3rd party services to be geographically close to a point that the UE 601 is attached to the network. This may reduce latency and load on the network. In edge computing implementations, the 5GC 600 may select a UPF 602 close to the UE 502 and execute traffic steering from the UPF 602 to DN 603 via the N6 interface. This may be based on the UE subscription data, UE location, and information provided by the AF 628, which allows the AF 628 to influence UPF (re)selection and traffic routing.

The DN 603 may represent various network operator services, Internet access, or third party services that may be provided by one or more servers including, for example, application (app)/content server 640. The DN 603 may be an operator external public, a private PDN, or an intra-operator packet data network, for example, for provision of IMS services. In this embodiment, the app server 640 can be coupled to an IMS via an S-CSCF or the I-CSCF. In some implementations, the DN 603 may represent one or more local area DNs (LADNs), which are DNs 603 (or DN names (DNNs)) that is/are accessible by a UE 601 in one or more specific areas. Outside of these specific areas, the UE 601 is not able to access the LADN/DN 603.

In some implementations, the application programming interfaces (APIs) for CIoT related services provided to the SCS/app server 640 is/are common for UEs 601 connected to an EPS and 5GS 600 and accessed via an Home Public Land Mobile Network (HPLMN). The level of support of the APIs may differ between EPS and 5GS. CIoT UEs 601 can simultaneously connect to one or multiple SCSs/app servers 640 and/or Afs 628.

In some implementations, the DN 603 may be, or include, one or more edge compute nodes 636. Additionally or alternatively, the DN 603 may be an Edge DN 603, which is a (local) Data Network that supports the architecture for enabling edge applications. In these embodiments, the app server 640 may represent the physical hardware systems/devices providing app server functionality and/or the application software resident in the cloud or at an edge compute node 636 that performs server function(s). In some embodiments, the app/content server 640 provides an edge hosting environment that provides support required for Edge Application Server's execution.

In some embodiments, the 5GS can use one or more edge compute nodes 636 to provide an interface and offload processing of wireless communication traffic. In these embodiments, the edge compute nodes 636 may be included in, or co-located with one or more RANs 610. For example, the edge compute nodes 636 can provide a connection between the RAN 610 and UPF 602 in the 5GC 600. The edge compute nodes 636 can use one or more NFV instances instantiated on virtualization infrastructure within the edge compute nodes 636 to process wireless connections to and from the RAN 610 and UPF 602.

In embodiments, the edge node 636 may include or be part of an edge system (or edge network). The edge node 636 may also be referred to as "edge hosts 636" or "edge servers 636." The edge system includes a collection of edge servers 636 and edge management systems (not shown) necessary to run edge computing applications within an operator network or a subset of an operator network. The edge servers 636 are physical computer systems that may include an edge platform and/or virtualization infrastructure, and provide compute, storage, and network resources to edge computing applications. Each of the edge servers 636 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 501, 601 The VI of the edge servers 636 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The SCP 630 (or individual instances of the SCP 630) supports indirect communication (see e.g., 3GPP TS 23.501 v16.2.0 (2019 Sep. 24)("[TS23501]")), section 7.1.1); delegated discovery (see e.g., [TS23501] section 7.1.1); message forwarding and routing to destination NF/NF service(s), communication security (e.g., authorization of the NF Service Consumer to access the NF Service Producer API), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., [TS23501] section 6.3). Load balancing, monitoring, overload control functionality provided by the SCP may be implementation specific. The SCP 230 may be deployed in a distributed manner. More than one SCP 630 can be present in the communication path between various NF Services. The SCP 630, although not an NF instance, can also be deployed distributed, redundant, and scalable.

The system architecture 600/300 may also include other elements that are not shown by FIG. 6 or 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

In another example, the 5G system architecture 600 includes an IP multimedia subsystem (IMS) as well as a plurality of IP multimedia core network subsystem entities, such as call session control functions (CSCFs) (not shown by FIG. 6 or 3). More specifically, the IMS includes a CSCF, which can act as a proxy CSCF (P-CSCF), a serving CSCF (S-CSCF), an emergency CSCF (E-CSCF), or interrogating CSCF (I-CSCF). The P-CSCF can be configured to be the first contact point for the UE 601 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be configured to function as the contact point within an operator's network for all IMS connections destined to a subscriber of that network operator, or a roaming subscriber currently located within that network operator's service area. In some aspects, the I-CSCF can be connected to another IP multimedia network, for example, an IMS operated by a different network operator.

In some implementations, the 5GS architecture also includes a Security Edge Protection Proxy (SEPP) as an entity sitting at the perimeter of the PLMN for protecting control plane messages. The SEPP enforces inter-PLMN security on the N32 interface. The 5GS architecture may also include an Inter-PLMN UP Security (IPUPS) at the perimeter of the PLMN for protecting user plane messages. The IPUPS is a functionality of the UPF 602 that enforces GTP-U security on the N9 interface between UPFs 602 of the visited and home PLMNs. The IPUPS can be activated with other functionality in a UPF 602 or activated in a UPF 602 that is dedicated to be used for IPUPS functionality (see e.g., [TS23501], clause 5.8.2.14).

Additionally, there may be many more reference points and/or service-based interfaces between the NF services in the NFs; however, these interfaces and reference points have been omitted from FIGS. 6 and 7 for clarity. In one example, the CN 620 may include an Nx interface, which is an inter-CN interface between the MME and the AMF 621 in order to enable interworking between system 200 and an EPC. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 8:
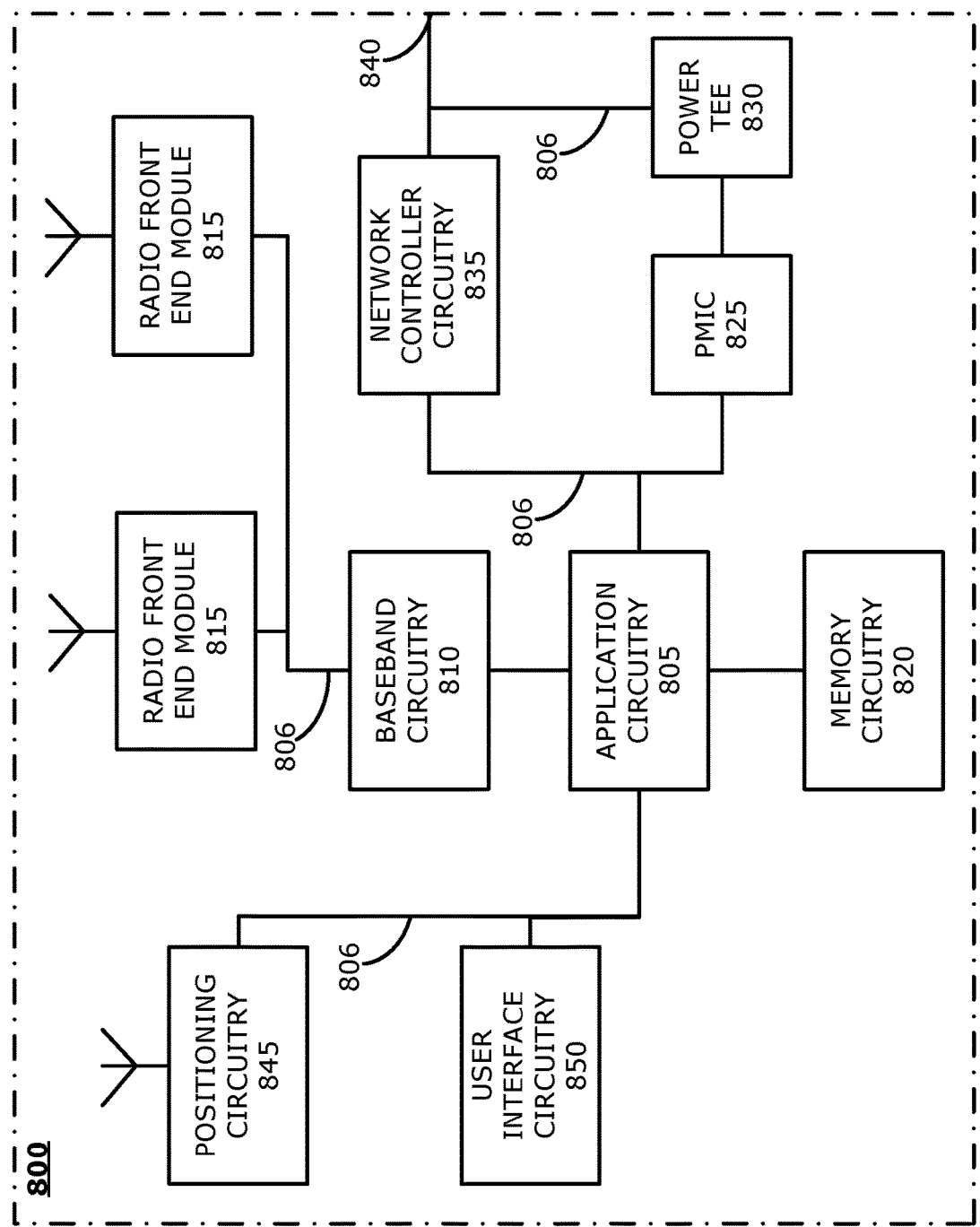
FIG. 8 illustrates an example of infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node such as the AN 508 shown and described previously, application server(s) 538, and/or any other element/device discussed herein. In other examples, the system 800 could be implemented in or by a UE 501.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry x05 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or 5GC, for example.

In some implementations, the application circuitry 805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 5111 of FIG. 5 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 provides for electrical power to be drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., AN 508, etc.), or the like.

The components shown by FIG. 8 may communicate with one another using interface circuitry, which may include any number of bus and/or interconnect (IX) technologies such as ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 9:
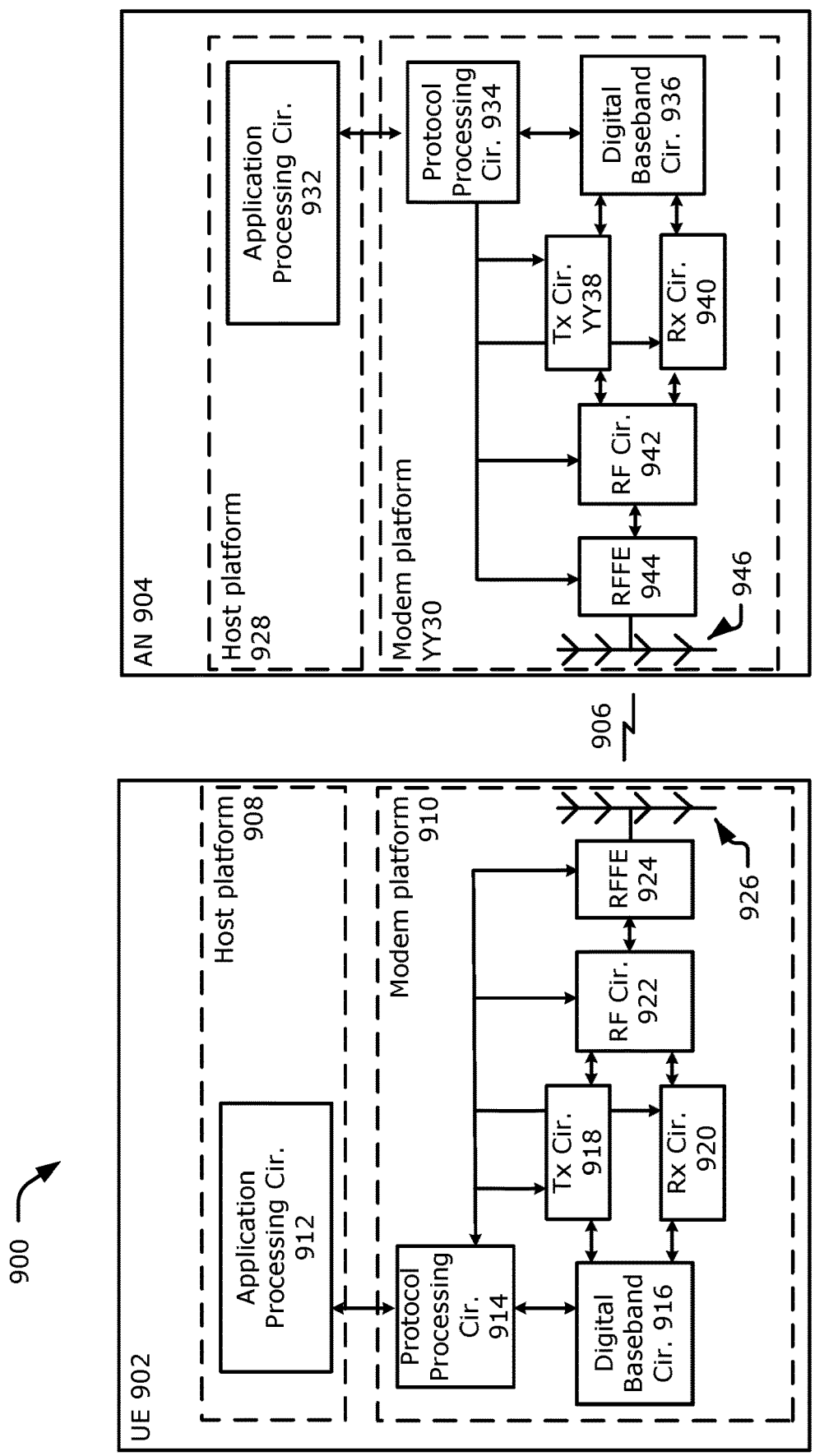
FIG. 9 schematically illustrates a wireless network in accordance with various embodiments.

FIG. 9 schematically illustrates a wireless network 900 in accordance with various embodiments. The wireless network 900 includes a UE 902 in wireless communication with an AN 904. The UE 902 and AN 94 may be the same, similar to, and/or substantially interchangeable with, like-named components described elsewhere herein such as the UE 601 and RAN 504 of FIG. 5, and/or system 800 of FIG. 4.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, TP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Although not shown, the components of UE 902 and/or AN 904 may communicate with one another using a suitable bus or interconnect (IX) technology, which may include any number of technologies, including ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX technology may be a proprietary bus, for example, used in an SoC based system.

Figure 10:
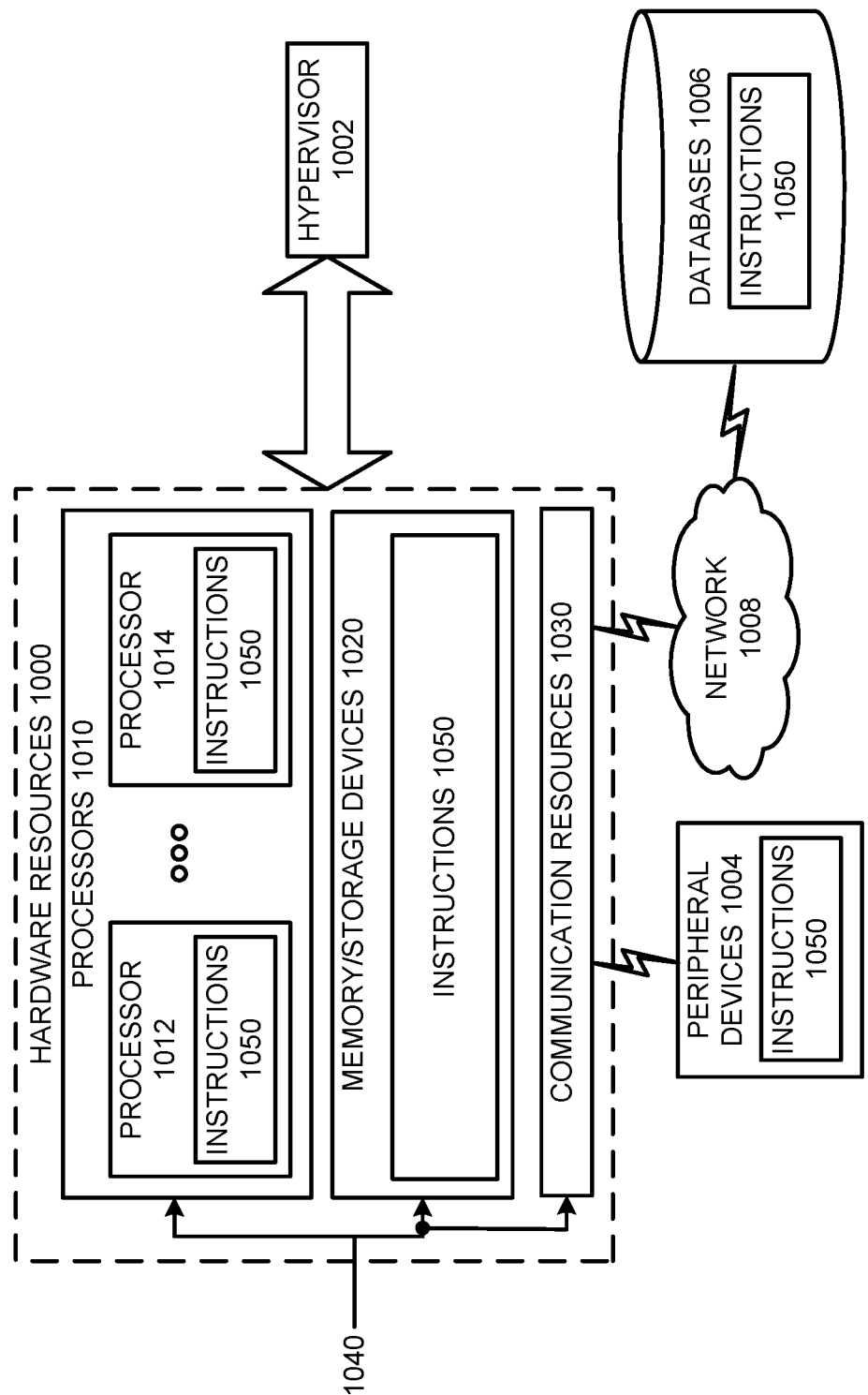
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 650 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

7. Example Implementations

Figure 11:
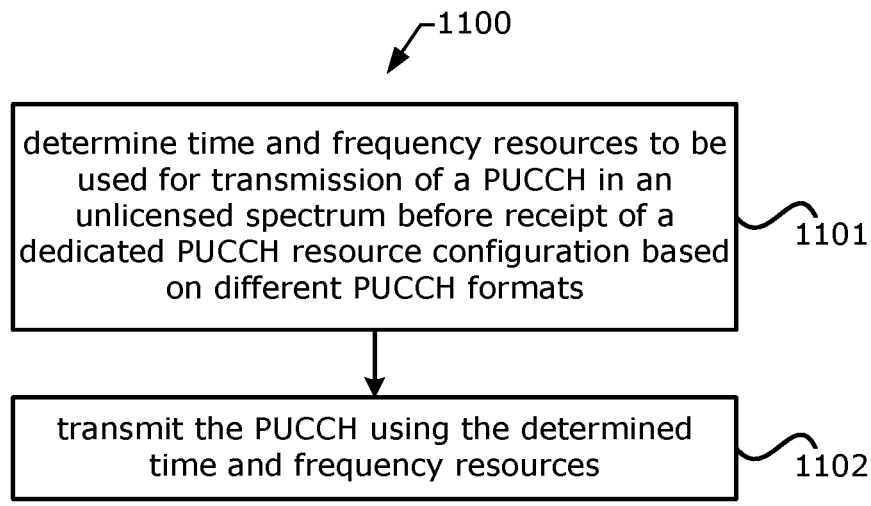
FIGS. 11, 12, and 13 illustrate example procedures for practicing various embodiments discussed herein.
Figure 12:
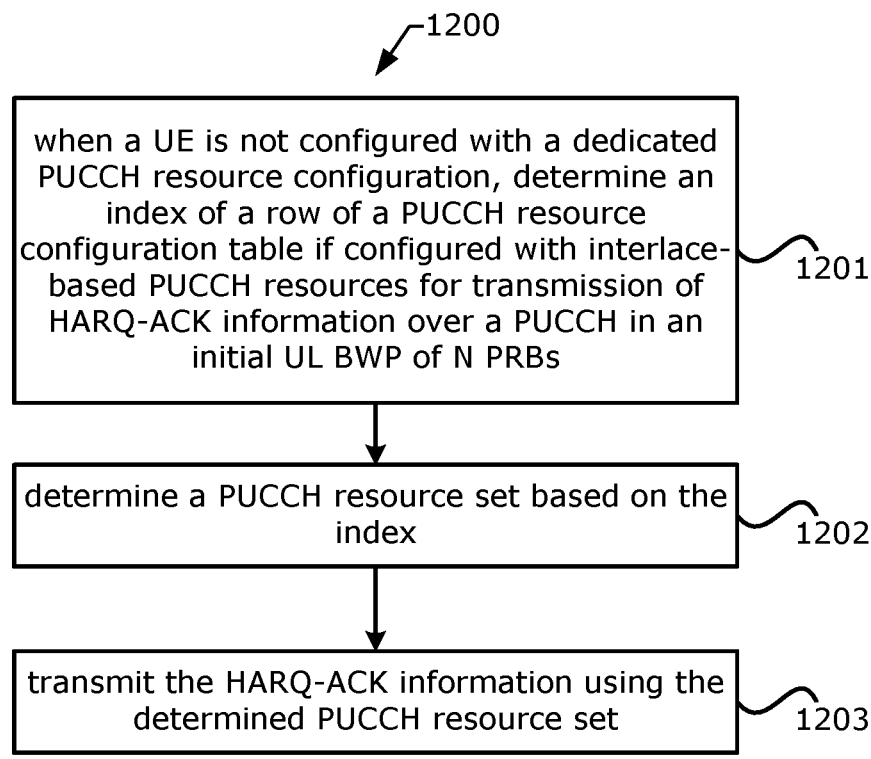
Figure 13:
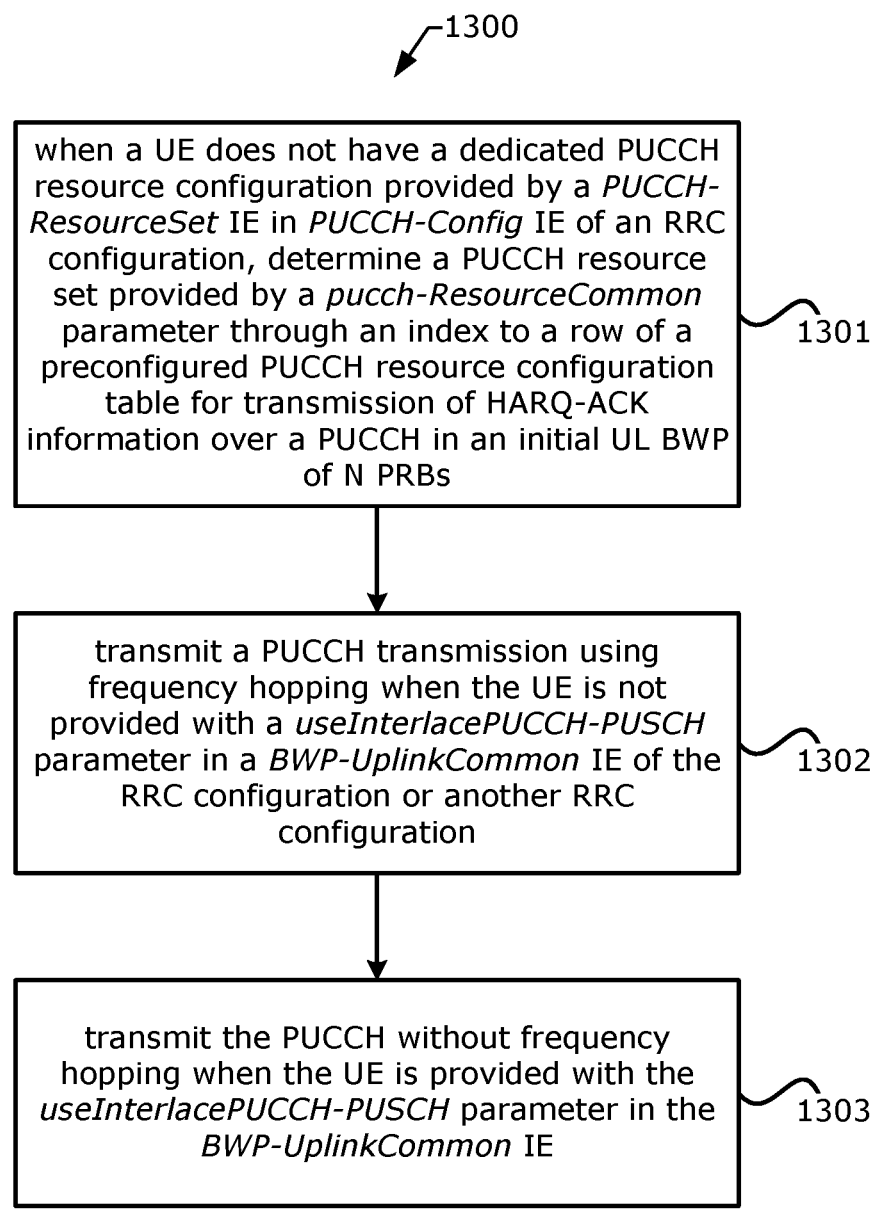

FIGS. 11, 12, and 13 illustrate processes 1100, 1200, and 1300, respectively for practicing various embodiments herein. While particular examples and orders of operations are illustrated FIGS. 11, 12, and 13, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1100 begins at operation 1101 where a UE 502 determines time and frequency resources to be used for transmission of a physical uplink control channel (PUCCH) in an unlicensed spectrum before receipt of a dedicated PUCCH resource configuration based on different PUCCH formats, wherein receipt of the dedicated PUCCH resource configuration is to take place during an initial access before a radio resource control (RRC) connection setup procedure.

At operation 1102, the UE 502 transmits the PUCCH using the determined time and frequency resources.

Process 12 begins at operation 1201 where, when a UE 502 is not configured with a dedicated Physical Uplink Control Channel (PUCCH) resource configuration, determine an index of a row of a PUCCH resource configuration table if configured with interlace-based PUCCH resources for transmission of hybrid automatic repeat request-acknowledgement (HARQ-ACK) information over a PUCCH in an initial uplink (UL) bandwidth part (BWP) of $N_{BWP}^{size}$ physical resource blocks (PRBs). At operation 1202, the UE 502 determines a PUCCH resource set based on the index, and operation 1203, the UE 502 transmits the HARQ-ACK information using the determined PUCCH resource set with or without frequency hopping.

Process 13 begins at operation 1301 where, when a UE 502 does not have a dedicated Physical Uplink Control Channel (PUCCH) resource configuration provided by a PUCCH-ResourceSet information element (IE) in PUCCH-Config IE of Radio Resource Control (RRC) configuration, the UE 502 determines a PUCCH resource set provided by a pucch-ResourceCommon parameter through an index to a row of a preconfigured PUCCH resource configuration table for transmission of hybrid automatic repeat request-acknowledgement (HARQ-ACK) information over a PUCCH in an initial uplink (UL) bandwidth part (BWP) of $N_{BWP}^{size}$ physical resource blocks (PRBs). Here, the PUCCH resource set includes sixteen resources, each corresponding to a PUCCH format, a first symbol, a duration, a PRB offset $RB_{BWP}^{offset}$, and a cyclic shift index set for a PUCCH transmission.

At operation 1302, the UE 502 transmits a PUCCH transmission using frequency hopping when the UE is not provided with a useInterlacePUCCH-PUSCH parameter in a BWP-UplinkCommon IE of the RRC configuration or another RRC configuration. At operation 1303, the UE 502 transmits the PUCCH without frequency hopping when the UE is provided with the useInterlacePUCCH-PUSCH parameter in the BWP-UplinkCommon IE.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a method of wireless communication for a 5G NR system operating in unlicensed spectrum (NR-unlicensed), the method comprising: determining or causing to determine time and frequency resources to be used for transmission of a physical uplink control channel (PUCCH) before dedicated PUCCH resource configuration, based on different PUCCH formats, in accordance with the regulatory requirements associated with the usage of unlicensed spectrum, wherein before dedicated PUCCH resource configuration includes during initial access, before RRC connection setup).

Example 2 includes the method of example 1 and/or some other examples herein, wherein PUCCH resource set before RRC connection set up is configured using existing PUCCH formats used in NR-licensed operation including PUCCH formats 0 and 1 which are inherently single-PRB PUCCH formats, each PRB comprising 12 sub-carriers, wherein both the single-PRB PUCCH formats are enhanced to multiple PRBs (e.g., n PRBs) so that OCB requirement is met, wherein the n PRBs are allocated contiguously in frequency, where n≥⌈{OCB/(12*SCS)}⌉, OCB is the occupied channel bandwidth criteria mandated by regulation (for example, 80%-100% of nominal channel bandwidth or temporally, 2 MHz bandwidth) and SCS is sub-carrier spacing (e.g., in FR1, SCS for PUCCH is 15/30/60 KHz), and the method comprises: applying or causing to apply an appropriate scaling in the above expression of n if OCB and SCS are expressed in different units; transmitting or causing to transmit 1-bit HARQ-ACK in response to message 4 during initial access using one of the multi-PRB PUCCH resources indicated by PUCCH resource index, wherein if allowed by regulation, OCB can be met using frequency hopping, so that the combined bandwidth of PUCCH in two hops meets OCB requirement, while BW of each frequency hop can be less than OCB, wherein each hop can have single PRB or more than one PRBs; and transmitting or causing to transmit 1-bit HARQ-ACK in response to message 4 during initial access using NR PUCCH format 0/1 with frequency hopping or enhanced PUCCH formats 0/1 with >1 PRBs with enabled frequency hopping.

Example 3 includes the method of example 2 and/or some other examples herein, wherein NR PUCCH resource configuration table before RRC connection is enhanced by providing additional parameters, which are either be pre-configured, indicated by higher layer signaling (via MSI, RMSI or OSI), or implicitly derived in order to support contiguous allocation of n PRBs using PUCCH formats 0 and 1 for PUCCH resource set, wherein the parameters include a number of PRBs (n) where n≥12/6/3 for SCS=15/30/60 KHz, a cyclic shift offset applied on n PRBs being $\Delta_{CS\text{-}offset}$, and intra-slot frequency hopping where 0 (disabled) or 1 (enabled), wherein $\Delta_{CS\text{-}offset}$ is either be a fixed offset, or a pattern of CS offsets which is predefined in 3GPP specification, or configured via higher layer signaling or derived implicitly as a function of other parameters (e.g., PUCCH resource index, symbol/slot index etc.), wherein n is either predefined, or can be configured by higher layer signaling, or a combination thereof (e.g., it can be pre-defined, but that value can be overwritten by higher layer signaling), and the method comprises: transmitting or causing to transmit 1-bit HARQ-ACK in response to message 4 during initial access using a PUCCH resource configured by the additional parameters along with the enhanced PUCCH formats.

Example 4 includes the method of example 3 and/or some other examples herein, wherein the additional parameters are incorporated in defining parameters that are implicitly derived for PUCCH resource configuration during initial access, for example, PRB index in the 1st hop, PRB index in the 2nd hop and initial CS index in the set of CS indexes, wherein single PRB PUCCH resource (as in NR-licensed) is enhanced to multi-PRB in NR-unlicensed, and PRB index of the ith PRB in the 1st and 2nd hops (when frequency hopping is enabled) is redefined as:

PRB index (1st hop) =
$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH}-8)/N_{CS} \rfloor - (i-1), & \text{otherwise} \end{cases}$$

PRB index (2nd hop) =
$$\begin{cases} RB_{BWP}^{offset} + \lfloor (r_{PUCCH}-8)/N_{CS} \rfloor + (i-1), & \text{if } \lfloor r_{PUCCH}/8 \rfloor = 1 \\ N_{BWP}^{size} - 1 - RB_{BWP}^{offset} - \lfloor r_{PUCCH}/N_{CS} \rfloor - (i-1), & \text{otherwise} \end{cases}$$

where, i=1, 2, . . . , n. If frequency hopping is disabled, the PRB indexes are derived as: PRB index (ith PRB)= $RB_{BWP}^{offset} + \lfloor r_{PUCCH}/N_{CS} \rfloor + (i-1)$, i=1, 2, . . . , n wherein the CS index applied on the ith PRB is defined as (initial CS index+$\Delta_{CS\text{-}offset,i}$) mod L, where $\Delta_{CS\text{-}offset,i}$ is the i-th element of an array of n different CS indexes either pre-defined in the spec, or configured via higher layer signaling, or implicitly derived as a function of other system parameters and L is the maximum allowed CS value (e.g., L=12), and/or wherein the CS index applied on the ith PRB is defined as (initial CS index+i*$\Delta_{CS\text{-}offset}$) mod L, where i=1, 2, . . . , n, L is the maximum allowed CS value and $\Delta_{CS\text{-}offset}$ is a fixed offset either pre-defined in the spec or is configured by higher layer signaling, wherein initial CS index is derived similar to NR-licensed system, e.g., from the set of initial CS indexes (last column of table 1), the initial CS index is chosen as the jth index within the set, where if frequency hopping is enabled, $$j = \begin{cases} r_{PUCCH} \bmod N_{CS}, & \text{if } \lfloor r_{PUCCH}/8 \rfloor = 0 \\ (r_{PUCCH}-8) \bmod N_{CS}, & \text{if } \lfloor r_{PUCCH}/8 \rfloor = 1 \end{cases}$$

and when frequency hopping is disabled, j=$r_{PUCCH}$ mod $N_{CS}$. UE uses these implicitly derived PRB indices and CS index to extract a PUCCH resource configuration and transmits 1-bit HARQ-ACK in response to message 4 during initial access.

Example 5 includes the method of example 2 and/or some other examples herein, wherein other parameters in the PUCCH resource configuration table is modified, for example, the first symbol and/or the number of symbols. The existing value(s) of PRB offset ($RB_{BWP}^{offset}$) is modified, for example, by scaling the existing values to n*existing value (where 0<n<1) or configuring new values that are not necessarily scaled version of the existing values, so as to make sure OCB requirement can be met, wherein the maximum value of PRB offset in Table 1, viz. $\lfloor N_{BWP}^{size}/4 \rfloor$ can be reduced, when 80% OCB is mandated by regulation, and the method comprises: transmitting or causing to transmit 1-bit HARQ-ACK in response to message 4 during initial access using the PUCCH resource configured by the modified parameters.

Example 6 includes the method of examples 1-5 and/or some other examples herein, wherein PUCCH resource set before RRC connection set up is configured using multi-PRB PUCCH formats from NR-licensed including PUCCH formats 2 and 3, wherein each of these formats are configured with n PRBs mapped contiguously across frequency in order to meet OCB requirement, where n≥$\lceil$ {OCB/(12*SCS)} $\rceil$, wherein, if allowed by regulation, OCB can be met using frequency hopping, so that the combined bandwidth of PUCCH in two hops meets OCB requirement, while BW of each frequency hop can be less than OCB. In this case, each hop can have single PRB or more than one PRBs, wherein for PUCCH format 4 (single-PRB format) with enabled frequency hopping can also be considered for PUCCH resource configuration, and the method comprises: transmitting or causing to transmit 1-bit HARQ-ACK in response to message 4 during initial access using PUCCH resource configured by PUCCH format 2 or 3 or 4.

Example 7 includes the method of example 6 and/or some other examples herein, wherein PUCCH formats 2/3 are used for PUCCH resource configuration during initial access and some of the existing parameters in NR-PUCCH format 2/3/4 configuration are revised, since those parameters are not available during initial access. As one example, cell radio network temporary identifier (C-RNTI) is not available during initial access, which is used in Rel-15 as scrambling ID for initializing scrambling sequence for encoded UCI bits, and instead of C-RNTI, TC-RNTI (temporary C-RNTI) available during initial access is used as scrambling ID, and the method comprises: transmitting or causing to transmit 1-bit HARQ-ACK in response to message 4 of initial access using these revised PUCCH formats 2/3/4 for PUCCH resource configuration during initial access.

Example 8 includes the method of example 6 and/or some other examples herein, wherein a second column of NR-PUCCH resource configuration table, namely "PUCCH format" is modified to configure PUCCH formats 2 and 3 replacing PUCCH formats 0 and 1, and the last column of Table 1, e.g., "set of initial CS indexes" is modified to "set of initial indexes", which can be time domain/frequency domain shift index for PUCCH formats 2/3, wherein to enable time domain multiplexing, column 4 of table 1 (number of symbols) can be modified such that the time shifted PUCCH resource does not cross the slot boundary, wherein PUCCH resources configured with PUCCH formats 2/3 may not always be aligned with the slot boundary, and the method comprises: transmitting or causing to transmit 1-bit HARQ-ACK in response to message 4 of random access using one of these PUCCH resources configured with PUCCH format 2/3/4 during initial access and transmits.

Example 9a includes the method of example 6 and/or some other examples herein, wherein the parameters that are implicitly derived for PUCCH resource configuration during initial access, for example, PRB index in the 1st hop, PRB index in the 2nd hop and initial shift index in the set of shift indexes, are enhanced to multi-PRB PUCCH resource configuration in NR-unlicensed, wherein ith PRB index in the 1st and 2nd hops (when frequency hopping is enabled) are redefined as:

PRB index (1st hop) =

$$\begin{cases} RB_{BWP}^{offset} + \lfloor r_{PUCCH}/N_{CS} \rfloor + (i-1), & \text{if } \lfloor r_{PUCCH}/8 \rfloor = 0 \\ N_{BWP}^{size} - 1 - RB_{BWP}^{offset} - \lfloor (r_{PUCCH} - 8)/N_{CS} \rfloor - (i-1), & \text{otherwise} \end{cases}$$

PRB indexes (2nd hop) ==

$$\begin{cases} RB_{BWP}^{offset} + \lfloor (r_{PUCCH} - 8)/N_{CS} \rfloor + (i-1), & \text{if } \lfloor r_{PUCCH}/8 \rfloor = 1 \\ N_{BWP}^{size} - 1 - RB_{BWP}^{offset} - \lfloor \frac{r_{PUCCH}}{N_{CS}} \rfloor - (i-1), & \text{otherwise} \end{cases}$$

where i=1, 2, . . . , n and $N_{CS}$ denotes total number of shift indexes which can be a time domain shift, or frequency domain shift. If frequency hopping is disabled, then the PRB indexes are derived as:

PRB index(ith PRB)=$RB_{BWP}^{offset}$+$\lfloor r_{PUCCH}/N_{CS} \rfloor$+(i−1),i=1,2, . . . ,n wherein other modifications of PUCCH resource configuration table during initial access as mentioned in claims 2 through 4, for example, modification of the values of PRB offset, first symbol, number of symbols, etc., and inclusion of additional parameters including a number of PRBs (n), intra-slot frequency hopping, etc., are also applicable here, and the method comprises: transmitting or causing to transmit 1-bit HARQ-ACK in response to message 4 during initial access using PUCCH resource configuration using these implicitly derived parameters.

Example 9b includes the method of example 9a and/or some other examples herein, wherein $RB_{BWP}^{offset}$ is the inter-PRB distance and i=1, 2, 3, . . . , n, the CS index applied on the ith PRB is defined as (initial CS index+$\Delta_{CS-offset,i}$) mod L.

Example 9c includes the method of example 9b and/or some other examples herein, wherein $\Delta_{CS-offset,i}$ is the i-th element of an array of n different CS indexes either pre-defined in the spec, or configured via higher layer signaling, or implicitly derived as a function of other system parameters and L is the maximum allowed CS value (e.g. L=12).

Example 9d includes the method of example 9b and/or some other examples herein, wherein the CS index applied on the ith PRB can be defined as (initial CS index+i* $\Delta_{CS-offset}$) mod L, where i=1, 2, . . . , n, L is the maximum allowed CS value and $\Delta_{CS-offset}$ is a fixed offset either pre-defined or is configured by higher layer signaling, wherein initial CS index is derived similar from the set of initial CS indexes, the initial CS index is chosen as the jth index within the set, wherein j=$r_{PUCCH}$ mod $N_{CS}$.

Example 10 includes the method of examples 1-9d and/or some other examples herein, wherein PUCCH resource set before RRC connection set up is configured using existing PUCCH formats used in NR-licensed operation, for example, PUCCH formats 0 and 1 which are inherently single-PRB (each PRB consisting of 12 sub-carriers) PUCCH formats. Both these single-PRB PUCCH formats are enhanced to multiple PRBs (e.g., n PRBs, n≥2. Further, these n PRBs are allocated non-contiguously in frequency (e.g., by using PRB based interlace), with inter-PRB distance m in between two consecutive PRBs such that OCB requirement is met: [(n−1)*m+1]*(12*SCS)≥OCB, wherein an interlace-based design with number of PRBs per interlace, n=2 is sufficient to meet OCB requirement by setting appropriate inter-PRB distance (m), while n>2 can be used in some cases, for example, to boost transmission power by exploiting PSD regulation (e.g., 10 dBm/1 MHz) and setting inter-PRB distance (m) accordingly (e.g., m is such that 12*SCS (in MHz)*m>1 MHz), and the method comprises: transmitting or causing to transmit 1-bit HARQ-ACK in response to message 4 during initial access using PUCCH resource configuration using these enhanced PUCCH formats.

Example 11 includes the method of example 10 and/or some other examples herein, wherein NR-PUCCH resource configuration table is enhanced by providing additional parameters, which is either be pre-configured, or indicated by higher layer signaling (via MSI, RMSI or OSI), or implicitly derived in order to support non-contiguous allocation of n PRBs using PUCCH formats 0 and 1 for PUCCH resource set configuration before RRC connection setup, wherein the parameters include: a number of PRBs (n) where n≥2, an inter-PRB distance (m) where 12*SCS (in MHz)*m>1 MHz, a cyclic shift offset applied on n PRBs being $\Delta_{CS-offset}$, and intra-slot frequency hopping where 0 (disabled), wherein $\Delta_{CS-offset}$ is either be a fixed offset, or a pattern of CS offsets which is predefined in specification, or configured via higher layer signaling or derived implicitly as a function of other parameters (e.g., PUCCH resource index, symbol/slot index etc.), wherein (n, m) is either be pre-defined, or is configured by higher layer signaling, or is a combination thereof (e.g., it is predefined, but that value is overwritten by higher layer signaling), wherein the intra-slot frequency hopping is disabled (in contrary to NR-licensed operation, where it is always enabled for PUCCH resource configuration during initial access) since frequency diversity can be already be achieved by non-contiguous frequency allocation, and the method comprises: transmitting or causing to transmit 1-bit HARQ-ACK in response to message 4 during initial access using the PUCCH resource configured by the parameters.

Example 12a includes the method of example 10 and/or some other examples herein, wherein some implicitly derived PUCCH resource parameters in NR-licensed, such as PRB index of the 1st and 2nd hops are repurposed to support PUCCH resource configuration with interlace-based PRB allocation in NR-unlicensed. For example, with n=2 and intra-slot frequency hopping disabled, PRB index of the 1st and 2nd PRBs are implicitly derived instead of PRB indexes of 1st and 2nd hops, wherein: PRB index (1st PRB) $\lfloor r_{PUCCH}/N_{CS} \rfloor$, and PRB index (2nd PRB)=$N_{BWP}^{size}-1-\lfloor ((r_{PUCCH,max}-r_{PUCCH})/N_{CS} \rfloor$, or the PRB index of the 2nd PRB is derived as PRB index (2nd PRB)=$N_{BWP}^{size}-1-\lfloor r_{PUCCH}/N_{CS} \rfloor$, and wherein the PRB index of the 2nd PRB can be selected as an offset from the PRB index of the 1st PRB, while the offset is IPD and the existing parameter $RB_{BWP}^{offset}$ is revised to indicate IPD (m) of the interlace based structure, and wherein PRB index (2nd PRB)=PRB index (1st PRB)+($RB_{BWP}^{offset}$+1), and when n>2, PRB index of the 1st PRB is derived as mentioned above and the PRB index of ith PRB of the interlace is derived as PRB index (ith PRB)=PRB index (1st PRB)+$\{(RB_{BWP}^{offset}+1)*(i-1)\}$ where $RB_{BWP}^{offset}$ is the inter-PRB distance and i=1, 2, 3, . . . , n, the CS index applied on the ith PRB is defined as (initial CS index+$\Delta_{CS\text{-}offset,i}$) mod L, where $\Delta_{CS\text{-}offset,i}$ is the i-th element of an array of n different CS indexes either pre-defined, configured via higher layer signaling, or implicitly derived as a function of other system parameters and L is the maximum allowed CS value (e.g., L=12), or the CS index applied on the ith PRB is defined as (initial CS index+i*$\Delta_{CS\text{-}offset}$) mod L, where i=1, 2, . . . , n, L is the maximum allowed CS value and $\Delta_{CS\text{-}offset}$ is a fixed offset either pre-defined or configured by higher layer signaling, wherein the initial CS index can be derived similar to NR-licensed system, e.g., from the set of initial CS indexes (last column of NR-PUCCH resource configuration table), and the initial CS index is chosen as the jth index within the set, where j=$r_{PUCCH}$ mod $N_{CS}$, and the method comprises: transmitting or causing to transmit 1-bit HARQ-ACK in response to message 4 during initial access using the additional parameters for PUCCH resource configuration using PUCCH formats 2/3/4.

Example 12b includes the method of examples 1-10 and/or some other examples herein, wherein the PRB offset ($RB_{BWP}^{offset}$) can be interpreted as starting interlace index, where the interlace indices and the associated set of PRBs are predefined for each numerology and/or combination of sub-carrier spacing and bandwidth, and the interlace indices of all the interlaces corresponding to a given PUCCH resource index are derived using an implicit or predefined rule.

Example 12c includes the method of example 12b and/or some other examples herein, wherein the interlace indices are derived using a formulae used for deriving PRB index of a 1st PRB in a 1st frequency hop such that $RB_{BWP}^{offset}$+$\lfloor r_{PUCCH}/N_{CS} \rfloor$ for any value of $r_{PUCCH}$ (e.g., 0≤$r_{PUCCH}$≤15), and wherein values of $RB_{BWP}^{offset}$ are modified such that the interlace index is within a predefined range.

Example 12d includes the method of example 12c and/or some other examples herein, wherein the interlace index(s) are less than 5 for 30 KHz SCS and less than 10 for 15 KHz SCS.

Example 12e includes the method of examples 1-10 and/or some other examples herein, wherein a set of initial CS indexes are modified such that interlace index(s) derived using the formula RBBwPset+$\lfloor r_{PUCCH}/N_{CS} \rfloor$ do not exceed a predefined range of interlace indexes allowed for a given numerology and/or SCS-BW combination.

Example 12f includes the method of examples 1-10 and/or some other examples herein, wherein a set of first symbols corresponding to one PUCCH resource index are defined using multiple values instead of a single value, and the PUCCH resource may not always be aligned with a slot boundary.

Example 12g includes the method of example 12f and/or some other examples herein, wherein the set of values chosen may be such that the first symbols are not consecutive to keep LBT gap between configured first symbols to different PUCCH resources (corresponding to a given index) potentially assigned to different UEs.

Example 12h includes the method of example 12g and/or some other examples herein, wherein the set of first symbols are from a set {0, 3, 6, 9, and 12} for index 0-2.

Example 12i includes the method of example 12h and/or some other examples herein, wherein if there are N number of first symbols, N number of PUCCH resources will be TDM'd, corresponding to a given PUCCH resource set index.

Example 12j includes the method of examples 12f-12h and/or some other examples herein, wherein the first symbol can be modified while still maintaining one starting symbol configuration corresponding to each PUCCH resource set index, and wherein different first symbol locations can be configured (e.g., any value between 0 and 11).

Example 12k includes the method of examples 1-12j and/or some other examples herein, wherein existing values of the number of symbols can be modified to create more TDM'd PUCCH resources in conjunction with multiple first symbol configurations for a given index.

Example 12l includes the method of example 12k and/or some other examples herein, wherein a value of the number of symbols corresponding to indexes 7-10 can be modified to 6 (from 10) and a corresponding first symbol can be changed from 4 to {0, 7} 0r {0, 8} or {1, 8}.

Example 12m includes the method of example 12l and/or some other examples herein, wherein two sets of non-overlapping TDM'd PUCCH resources can be configured for a given index by such configuration.

Example 12n includes the method of examples 1-10 and/or some other examples herein, wherein non-zero OCC index(es) can be configured for PUCCH format 1 and/or format 0 to create another orthogonal dimension for PUCCH resources corresponding to an index.

Example 12o includes the method of examples 1-10 and/or some other examples herein, wherein different tables can be defined for different numerologies, and wherein two different tables can be defined for 15 KHz and 30 KHz SCS.

Example 12p includes the method of examples 1-10 and/or some other examples herein, wherein a table defined for 30 KHz SCS (ith less interlace indexes available can be defined as a baseline and can be used for 15 KHz SCS such that some interlace indexes available for 15 KHz SCS are not being used as PUCCH resources, for example, interlace index 5-9 are not used.

Example 13a includes the method of example 10 and/or some other examples herein, wherein the existing value(s) of PRB offset ($RB_{BWP}^{offset}$) is modified so as to make sure OCB requirement is met. For example, the maximum value of PRB offset in NR PUCCH resource configuration table, viz. $\lfloor N_{BWP}^{size}/4 \rfloor$ can be reduced, when 80% OCB is mandated by regulation, and the method comprises: transmitting or causing to transmit 1-bit HARQ-ACK in response to message 4 during initial access using the modified parameters for PUCCH resource configuration.

Example 13b includes the method of example 10 and/or some other examples herein, wherein the PUCCH resource sets before dedicated PUCCH resource configuration can be modified such that corresponding to each PUCCH resource set index, $n_1$, $n_2$ and $n_3$ number of time, frequency and code domain resources are configured such that $n_1*n_2*n_3 \geq N$, where N is the number of PUCCH resources corresponding to each PUCCH resource set index.

Example 13c includes the method of example 13b and/or some other examples herein, wherein N=16.

Example 14 includes the method of example 1 and/or some other examples herein, wherein PUCCH resource set before RRC connection set up is configured using multi-PRB PUCCH formats from NR-licensed including PUCCH formats 2 and 3, wherein each of these formats is configured with n PRBs mapped non-contiguously across frequency (e.g., using PRB based interlace using n≥2), with inter-PRB distance m in between two consecutive PRBs such that OCB requirement is met, wherein: $[(n-1)*m+1]*(12*SCS) \geq$ OCB, wherein an interlace-based design with number of PRBs per interlace, n=2 is sufficient to meet OCB requirement by setting appropriate inter-PRB distance (m), while n>2 is used in some cases, for example, to boost transmission power by exploiting PSD regulation (e.g., 10 dBm/1 MHz) and setting inter-PRB distance (m) accordingly (e.g., m is such that 12*SCS (in MHz)*m>1 MHz), and the method comprises: transmitting or causing to transmit 1-bit HARQ-ACK in response to message 4 during initial access using the PUCCH resource configuration using these enhanced PUCCH formats.

Example 15 includes the method of example 14 and/or some other examples herein, wherein the second column of NR-PUCCH resource configuration table, namely "PUCCH format" is modified to configure PUCCH formats 2 and 3 replacing PUCCH formats 0 and 1, wherein the last column of the table, e.g., "set of initial CS indexes" is modified to "set of initial indexes", which is time domain/frequency domain shift index for PUCCH formats 2/3, wherein to enable time domain multiplexing, column 4 of the table (number of symbols) can be modified such that the time shifted PUCCH resource does not cross the slot boundary, and wherein PUCCH resources configured with PUCCH formats 2/3 may not be always aligned with the slot boundary, and wherein the table is enhanced by providing additional parameters, which are either be pre-configured, or indicated by higher layer signaling (via MSI, RMSI or OSI), or implicitly derived in order to support non-contiguous allocation of n PRBs using PUCCH formats 2 and 3 for PUCCH resource set configuration before RRC connection setup, wherein the parameters include: n≥2 number of PRBs (n), an Inter-PRB distance (m) is 12*SCS (in MHz)*m>1 MHz, and intra-slot frequency hopping is disabled, wherein intra-slot frequency hopping is disabled (in contrary to NR-licensed operation, where it is always enabled for PUCCH resource configuration during initial access) since frequency diversity can be already be achieved by non-contiguous frequency allocation, and the method comprises: transmitting or causing to transmit 1-bit HARQ-ACK in response to message 4 during initial access using PUCCH resource configured by the additional parameters along with the enhanced PUCCH formats.

Example 16 includes the method of example 14 and/or some other examples herein, wherein some implicitly derived PUCCH resource parameters in NR-licensed, such as PRB index of the 1st and 2nd hops are repurposed to support PUCCH resource configuration with interlace-based PRB allocation in NR-unlicensed. For example, with n=2 and intra-slot frequency hopping disabled, PRB index of the 1st and 2nd PRBs are implicitly derived instead of PRB indexes of 1st and 2nd hops, wherein: PRB index (1st PRB)=$\lfloor r_{PUCCH}/N_{CS} \rfloor$, and PRB index (2nd PRB)=$N_{BWP}^{size}-1-\lfloor((r_{PUCCH,max}-r_{PUCCH})/N_{CS}) \rfloor$, or the PRB index of the 2nd PRB can be derived as PRB index (2nd PRB)=$N_{BWP}^{size}-1-\lfloor r_{PUCCH}/N_{CS} \rfloor$, and/or the PRB index of the 2nd PRB is selected as an offset from the PRB index of the 1st PRB, while the offset is IPD and the existing parameter $RB_{BWP}^{offset}$ is revised to indicate IPD (m) of the interlace based structure, and wherein: PRB index (2nd PRB)=PRB index (1st PRB)+($RB_{BWP}^{offset}$+1), wherein when n>2, PRB index of the 1st PRB is derived as mentioned above and the PRB index of ith PRB of the interlace is derived as PRB index (ith PRB)=PRB index (1st PRB)+$\{(RB_{BWP}^{offset}+1)*(i-1)\}$, where $RB_{BWP}^{offset}$ is the inter-PRB distance and i=1, 2, 3, . . . , n and $N_{CS}$ denotes total number of shift indexes which is a time domain shift, or frequency domain index, wherein other modifications of PUCCH resource configuration table, for example, modification of the values of PRB offset etc. are also applicable here, whereub the above claims related to non-contiguous frequency allocation (claims 9 through 15) are also applicable if frequency hopping is enabled, and wherein if frequency hopping is enabled, PRB indices of the 1st hop and 2nd hop are additionally derived, and the method comprises: transmitting or causing to transmit 1-bit HARQ-ACK in response to message 4 during initial access using the implicitly derived/additional parameters for PUCCH resource configuration using PUCCH formats 2/3.

Example 17 includes the method of example 1 and/or some other examples herein, wherein multiple first symbols in a slot is defined corresponding to one row in the PUCCH resource configuration table so that listen-before-talk (LBT) congestion can be alleviated and depending on LBT outcome, and the method comprises: determining or causing to determine (or selecting or causing to select) a first symbol for PUCCH transmission; and applying or causing to apply puncturing or rate matching as appropriate, or wherein the last symbol of PUCCH is always aligned with slot boundary, e.g., when the first symbol is determined, the length of PUCCH transmission is also determined.

Example 18 includes the method of example 17 and/or some other examples herein, wherein multiple slot opportunities are configured for PUCCH transmission, wherein a PUCCH transmission window is defined wherein the window size is configured via RMSI, and the method comprises: transmitting or causing to transmit the PUCCH starting from the indicated slot; continuing or causing to continue, if the LBT fails, to try a next available UL slot for PUCCH transmission until the last slot in the window is reached, wherein in each slot, the same starting symbol is used for PUCCH transmission, wherein the current starting symbol in the table can be maintained, and wherein the method is applicable irrespective of PUCCH formats used for resource configuration and applicable to both contiguous and non-contiguous frequency allocations.

Example 19 includes the method of examples 1-18 and/or some other examples herein, wherein applying OCC can be an additional dimension to further randomize interference for PUCCH formats 0/2, for example, for enhanced PUCCH format 0 with 2 symbols, length-2 OCC could be applied, wherein the applied OCC index can be bound to cyclic shifts.

Example 20 includes the method of examples 10 and 14 and/or some other examples herein, wherein new short and long PUCCH formats are defined for interlace based (e.g., non-contiguous) frequency allocation of PUCCH resource configuration before initial access, wherein while the short PUCCH format can be based on NR PUCCH formats 0/2 and the long PUCCH format can be based on NR PUCCH formats 1/3/4, the new formats designed for interlace based frequency allocation can have additional features, wherein PUCCH formats 0/2 in NR can be extended to have more than 2 symbols (while PUCCH formats 0/2 in NR are restricted to maximum 2 symbols), and the new long PUCCH format spanning over more than 1 PRBs can have per PRB different OCCs applied over the multiple symbols for interference randomization.

Example 21 may include a method of operating a UE, the method comprising: determining the UE is not configured with a dedicated PUCCH resource configuration; determining an index of a row of the preconfigured table if configured with interlace-based PUCCH resource for transmission of HARK-ACK information on PUCCH in an initial uplink bandwidth part of $N_{BWP}^{size}$ physical resource blocks (PRBs); and determine a PUCCH resource set based on the index.

Example 22 may include the method of example 21 and/or some other examples herein, further comprising receiving an RRC parameter useInterlacePUCCH-Common and determine that the UE is configured with interlace-based PUCCH resource based on said receipt of the RRC parameter.

Example 23 may include the method of examples 21-22 and/or some other examples herein, further comprising: receiving an RRC parameter pucch-ResourceCommon; and determining the index based on the RRC parameter.

Example 24 may include the method of examples 21-23 and/or some other examples herein, wherein the PUCCH resource includes 16 resources, each corresponding to a PUCCH format, a first symbol for a PUCCH resource with format 1 or a set of first symbols for a PUCCH resource with format 0, a duration, a starting interlace index I_start, a orthogonal cover code index set for a PUCCH resource with format 1 and a cyclic shift index set for a PUCCH transmission.

Example 25 may include the method of examples 21-24 and/or some other examples herein, further comprising: transmitting a PUCCH without frequency hopping.

Example 26 may include the method of examples 21-25 and/or some other examples herein, wherein the preconfigured table corresponds to Table 1x as shown herein.

Example 27 includes the method of examples 1-26 and/or some other examples herein, wherein the method is performed by a user equipment (UE).

Example Z01 may include an apparatus comprising means to perform one or more elements of a method described in or related to any of examples 1-27, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example Z03 may include an apparatus comprising logic, modules, or circuitry to perform one or more elements of a method described in or related to any of examples 1-27, or any other method or process described herein.

Example Z04 may include a method, technique, or process as described in or related to any of examples 1-27, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-27, or portions thereof.

Example Z06 may include a signal as described in or related to any of examples 1-27, or portions or parts thereof.

Example Z07 may include a datagram, packet, frame, segment, protocol data unit (PDU), or message as described in or related to any of examples 1-27, or portions or parts thereof, or otherwise described in the present disclosure.

Example Z08 may include a signal encoded with data as described in or related to any of examples 1-27, or portions or parts thereof, or otherwise described in the present disclosure.

Example Z09 may include a signal encoded with a datagram, packet, frame, segment, protocol data unit (PDU), or message as described in or related to any of examples 1-27, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-27, or portions thereof.

Example Z11 may include a computer program comprising instructions, wherein execution of the program by a processing element is to cause the processing element to carry out the method, techniques, or process as described in or related to any of examples 1-27, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

8. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus to be employed as a user equipment (UE), the apparatus comprising:
processor circuitry configurable to determine time and frequency resources to be used for transmission of a physical uplink control channel (PUCCH) in an unlicensed spectrum before receipt of a dedicated PUCCH resource configuration based on different PUCCH formats, wherein the receipt of the dedicated PUCCH resource configuration is to take place during an initial access before a radio resource control (RRC) connection setup procedure; and
radiofrequency (RF) circuitry communicatively coupled with the processor circuitry, the RF circuitry operable to transmit the PUCCH using the determined time and frequency resources.

2. The apparatus of claim 1, wherein a PUCCH resource set before the RRC connection setup is configured using a single physical resource block (PRB) PUCCH format that is enhanced to include n number of PRBs so that an Occupied Channel Bandwidth (OCB) requirement is met, wherein the n PRBs are allocated contiguously in frequency, n≥[{OCB/(12*SCS)}], and SCS is a sub-carrier spacing, and wherein:
the processor circuitry is configurable to apply a scaling factor to n when the OCB and the SCS are expressed in different units; and
the RF circuitry is operable to transmit a 1-bit hybrid automatic repeat request acknowledgement (HARQ-ACK) during the initial access using one of multi-PRB PUCCH resources indicated by a PUCCH resource index.

3. The apparatus of claim 1, wherein a PUCCH resource set before the RRC connection setup is configured using a single physical resource block (PRB) PUCCH format that is enhanced to include n number of PRBs, wherein the n PRBs are allocated non-contiguously in frequency with inter-PRB distance m in between two consecutive PRBs such that an OCB requirement is met, wherein [(n−1)*m+1]*(12*SCS) ≥OCB, SCS is a sub-carrier spacing, and m is a value such that 12*SCS (in MHz)*m>1 MHz, and the RF circuitry is operable to:
transmit a 1-bit HARQ-ACK during the initial access using the dedicated PUCCH resource configuration using the enhanced PUCCH formats.

4. The apparatus of claim 3, wherein a PUCCH resource configuration table for the unlicensed spectrum indicates values for n where n≥2, m where 12*SCS (in MHz)*m>1 MHZ, a cyclic shift offset applied on the n PRBs being $\Delta_{CS\text{-}offset}$, and intra-slot frequency hopping, and the RF circuitry is operable to:
transmit the 1-bit HARQ-ACK using the PUCCH resources indicated by the PUCCH resource configuration table.

5. The apparatus of claim 4, wherein a PRB index of 1st and 2nd hops used for a licensed spectrum are repurposed to support the PUCCH resource configuration with interlace-based PRB allocation in the unlicensed spectrum.

6. The apparatus of claim 4, wherein the processor circuitry is further configurable to:
interpret a PRB offset ($RB_{BWP}^{offset}$) as a starting interlace index among a plurality of interlace indices, wherein the plurality of interlace indices and an associated set of PRBs are predefined for each numerology or combination of sub-carrier spacing and bandwidths, and
derive the starting interlace index corresponding to a given PUCCH resource index using an implicit rule or a predefined rule.

7. The apparatus of claim 6, wherein the processor circuitry is further configurable to:
derive the starting interlace index using a formula used for derivation of a PRB index of a $1^{st}$ PRB in a $1^{st}$ frequency hop such that $RB_{BWP}^{offset}+\lfloor r_{PUCCH}/N_{CS}\rfloor$ for any value of $r_{PUCCH}$ (e.g., $0 \le r_{PUCCH} \le 15$), and wherein values of $RB_{BWP}^{offset}$ are modified such that the starting BWP interlace index is within a predefined range.

8. The apparatus of claim 7, wherein the plurality of interlace indices are less than 5 for 30 KHz SCS and less than 10 for 15 KHz SCS.

9. The apparatus of claim 7, wherein a set of initial CS indexes are modified such that the plurality of interlace indices are derived such that $RB_{BWP}^{offset}+\lfloor r_{PUCCH}/N_{CS}\rfloor$ does not exceed a predefined range of interlace indexes allowed for a given numerology or an SCS-bandwidth (BW) combination.

10. The apparatus of claim 7, wherein a set of first symbols corresponding to one PUCCH resource index is defined using multiple values instead of a single value, and the PUCCH resource is or is not always aligned with a slot boundary.

11. The apparatus of claim 4, wherein multiple first symbols in a slot are defined corresponding to one row in the PUCCH resource configuration table so that listen-before-talk (LBT) congestion can be alleviated and depending on an outcome of LBT, and the processor circuitry is further configurable to:
determine a first symbol for the PUCCH transmission; and
apply puncturing or rate matching at or around the determined first symbol.

12. The apparatus of claim 11, wherein multiple slot opportunities are configured for the PUCCH transmission, and the processor circuitry is configurable to:
attempt to transmit the PUCCH starting from an indicated slot of the multiple slot opportunities; and
when the LBT fails, try a next available slot of the multiple slot opportunities for the PUCCH until a last slot in a predefined or configured PUCCH transmission window is reached.

13. One or more non-transitory computer-readable media (NTCRM) comprising instructions, wherein execution of the instructions by one or more processors of a user equipment (UE) is to cause the UE to:
- when the UE is not configured with a dedicated Physical Uplink Control Channel (PUCCH) resource configuration, determine an index of a row of a PUCCH resource configuration table when configured with interlace-based PUCCH resources for transmission of hybrid automatic repeat request acknowledgement (HARQ-ACK) information over a PUCCH in an initial uplink (UL) bandwidth part (BWP) of $N_{BWP}^{size}$ physical resource blocks (PRBs);
- determine a PUCCH resource set based on the index; and
- transmit the HARQ-ACK information using the determined PUCCH resource set without frequency hopping.

14. The one or more NTCRM of claim 13, wherein execution of the instructions is to further cause the UE to:
- determine the PUCCH resource set based on a pucch-ResourceCommon parameter through the index to the row of the PUCCH resource configuration table when configured with the interlace-based PUCCH resources.

15. The one or more NTCRM of claim 13, wherein the configuration of the interlace-based PUCCH indicated by a useInterlacePUCCH-Common parameter.

16. The one or more NTCRM of claim 13, wherein the PUCCH resource set includes 16 resources, each corresponding to a PUCCH format, a first symbol for a PUCCH resource with format 1 or a set of first symbols for a PUCCH resource with format 0, a duration, a starting interlace index $I_{start}$, an orthogonal cover code index set for a PUCCH resource with the format 1, and a cyclic shift index set for a PUCCH transmission.

17. One or more non-transitory computer-readable media (NTCRM) comprising instructions, wherein execution of the instructions by one or more processors of a user equipment (UE) is to cause the UE to:
- when the UE does not have a dedicated Physical Uplink Control Channel (PUCCH) resource configuration provided by a PUCCH-ResourceSet information element (IE) in PUCCH-Config IE of Radio Resource Control (RRC) configuration,
- determine a PUCCH resource set provided by a pucch-ResourceCommon parameter through an index to a row of a preconfigured PUCCH resource configuration table for transmission of hybrid automatic repeat request acknowledgement (HARQ-ACK) information over a PUCCH in an initial uplink (UL) bandwidth part (BWP) of $N_{BWP}^{size}$ physical resource blocks (PRBs),
- wherein the PUCCH resource set includes sixteen resources, each corresponding to a PUCCH format, a first symbol, a duration, a PRB offset $RB_{BWP}^{offset}$, and a cyclic shift index set for a PUCCH transmission;
- transmit a PUCCH transmission using frequency hopping when the UE is not provided with a useInterlacePUCCH-PUSCH parameter in a BWP-UplinkCommon IE of the RRC configuration or another RRC configuration; and
- transmit the PUCCH without frequency hopping when the UE is provided with the useInterlacePUCCH-PUSCH parameter in the BWP-UplinkCommon IE.

18. The one or more NTCRM of claim 17, wherein execution of the instructions is to further cause the UE to:
- determine a PUCCH resource with index $r_{PUCCH}$, as $$r_{PUCCH} = \left\lfloor \frac{2 \cdot n_{CCE,0}}{N_{CCE}} \right\rfloor + 2 \cdot \Delta_{PRI},$$

wherein $0 \leq r_{PUCCH} \leq 15$, $N_{CCE}$ is a number of Control Channel Elements (CCEs) in a control resource set (CORESET) of a Physical Downlink Control Channel (PDCCH) reception with a detected downlink control information (DCI) format, $n_{CCE,0}$ is an index of a first CCE for the PDCCH reception, and $\Delta_{PRI}$ is a value of a PUCCH resource indicator field in the DCI format.

19. The one or more NTCRM of claim 17, wherein execution of the instructions is to further cause the UE to:
- when the UE is provided with a PUCCH resource by pucch-ResourceCommon and is provided with the useInterlacePUCCH-PUSCH parameter in the BWP-UplinkCommon IE, determine for the PUCCH resource an interlace index m as $m = (m_0 + \lfloor r_{PUCCH}/N_{CS} \rfloor) \bmod M$ where M is a number of interlaces and $m_0 = RB_{BWP}^{offset}$ is an interlace index offset and $RB_{BWP}^{offset}$ is as given in the preconfigured PUCCH resource configuration table; and
- determine an initial cyclic shift index in a set of initial cyclic shift indexes as $r_{PUCCH} \bmod N_{CS}$, where $N_{CS}$ is a total number of initial cyclic shift indexes in the set of initial cyclic shift indexes in the preconfigured PUCCH resource configuration table.

20. The one or more NTCRM of claim 17, wherein execution of the instructions is to further cause the UE to:
- when the UE is provided with a PUCCH resource by pucch-ResourceCommon, determine an orthogonal cover code (OCC) index in a set of OCC indexes for a PUCCH resource with PUCCH format 1 as $\lfloor r_{PUCCH}/8 \rfloor$;
- when $\lfloor r_{PUCCH}/8 \rfloor = 0$, determine an interlace index of the PUCCH transmission as $(I_{start} + \lfloor r_{PUCCH}/N_{CS} \rfloor) \bmod M$, and determine an initial cyclic shift index in a set of initial cyclic shift indexes as $r_{PUCCH} \bmod N_{CS}$; and
- when $\lfloor r_{PUCCH}/8 \rfloor = 10$, determine an interlace index of the PUCCH transmission as $(I_{start} + \lfloor (r_{PUCCH} - 8)/N_{CS} \rfloor) \bmod M$, and determine the initial cyclic shift index in the set of initial cyclic shift indexes as $(r_{PUCCH} - 8) \bmod N_{CS}$;
- wherein $I_{start}$ is a starting interlace index, M is a number of interlaces, and $N_{CS}$ is a total number of initial cyclic shift indexes in the set of initial cyclic shift indexes in the preconfigured PUCCH resource configuration table.

* * * * *